United States Patent [19]
Hasegawa et al.

[11] Patent Number: 5,860,673
[45] Date of Patent: Jan. 19, 1999

[54] SEAT STRUCTURE HAVING A SIDE IMPACT AIR BAG APPARATUS

[75] Inventors: Yasunori Hasegawa, Kasugai; Hisaaki Kato, Anjyo; Mituyoshi Ohno, Toyota; Shigeharu Nakai, Toyota; Hitoshi Yanase, Toyota; Kenji Matsuzaki, Toyota; Masahito Kanehara, Toyota, all of Japan

[73] Assignees: Toyota Jidosha Kabushiki Kaisha; Araco Kabushiki Kaisha, both of Toyota, Japan

[21] Appl. No.: 714,344

[22] Filed: Sep. 16, 1996

[30] Foreign Application Priority Data

| Sep. 18, 1995 | [JP] | Japan | 7-238318 |
| Mar. 7, 1996 | [JP] | Japan | 8-050150 |
| Jul. 22, 1996 | [JP] | Japan | 8-192457 |

[51] Int. Cl.$^6$ ................................... B60R 21/22
[52] U.S. Cl. .................. 280/730.2; 280/728.3; 297/216.13
[58] Field of Search ................ 280/730.1, 730.2, 280/728.3; 297/216.13, 216.12, 452.62, 452.61

[56] References Cited

U.S. PATENT DOCUMENTS

| 5,112,079 | 5/1992 | Haland et al. | 280/730.2 |
| 5,222,761 | 6/1993 | Kaji et al. | 280/730.2 |
| 5,251,931 | 10/1993 | Semchena et al. | 280/730.2 |
| 5,348,342 | 9/1994 | Haland et al. | 280/730.2 |
| 5,498,030 | 3/1996 | Hill et al. | 280/730.2 |
| 5,630,615 | 5/1997 | Miesik | 280/730.2 |
| 5,651,582 | 7/1997 | Nakano | 280/730.2 |

*Primary Examiner*—Eric D. Culbreth
*Attorney, Agent, or Firm*—Pillsbury Madison & Sutro LLP

[57] ABSTRACT

A seat structure having a side impact air bag apparatus, constructed such that the air bag apparatus, which is integrated into a side portion of a seat back which side portion opposes a vehicle door, is activated at the time of a side impact such that a sewn portion of a seat surface layer, which is formed by sewing a front seat surface layer for covering the front of the seat back to a side seat surface layer for covering the side of the seat back, breaks and an air bag body inflates between a side portion of a vehicle body and the side of a vehicle occupant, comprising a sheet member provided inside the side seat surface layer integrally with the side seat surface layer, the sheet member being harder to stretch than the side seat surface layer, and one end of the sheet member being sewn to the sewn portion; and a fixing member provided inside the seat back, the fixing member being engaged with another end of the sheet member which is provided on the opposite side of the one end of the sheet member.

35 Claims, 27 Drawing Sheets

SEAT STRUCTURE HAVING A SIDE IMPACT AIR BAG APPARATUS

BACKGROUND OF THE INVENTION

1. Field of the Invention

The present invention relates to a seat structure having a side impact air bag apparatus, and particularly to a seat structure having a side impact air bag apparatus which is incorporated into a side portion of a seat back which side portion opposes a door of the vehicle.

2. Description of the Related Art

Various countermeasures have heretofore been taken to better protect vehicle occupants against impacts occurring at the side of a vehicle (hereinafter referred to simply as "side impacts"). As one example, a structure in which a side impact air bag apparatus is incorporated into the side of a front seat of a vehicle has been developed in recent years. Such air bag apparatuses are disclosed in, for example, U.S. Pat. Nos. 5,112,079, 5,222,761, 5,251,931 and 5,498,030. A front seat structure in which this type of air bag apparatus has been incorporated has been disclosed in U.S. Pat. No. 5,348,342. The structure disclosed in this latter publication, and the seat surface layer thereof in particular, will be described hereinafter.

FIG. 24 is a side view showing a front seat 150 of the type in which an air bag apparatus, such as the type disclosed in U.S. Pat. No. 5,348,342, has been incorporated. As shown in FIG. 24, a side impact air bag apparatus 154 is incorporated into the side portion of a seat back 152 of the front seat 150, which side portion opposes an unillustrated vehicle door. The air bag apparatus 154 basically comprises a sensor 157 which is disposed below a seat cushion 156 and detects the state of application of a load to the side door, a substantially cylindrical inflator 158 which is connected to the sensor 157 and produces gas in response to the applied state detected by the sensor 157, and an air bag 160 inflated by a flow of gas injected from the inflator 158. Further, the inflator 158 and the bag 160 are accommodated within a space defined between an air bag case 164 and a lid 166 both fixed to the side portion of a seat back frame 162 (see FIG. 25) which side portion opposes the vehicle door.

As can be seen in the enlarged view of FIG. 25, a seat surface layer 168 of the seat back 152 is divided into a plurality of seat surface layers and the divided seat surface layers are sewn together and allow the lid 166 to open upon inflation of a bag. Namely, the seat surface layer 168 of the seat back 152 is divided into a front main seat surface layer 170 for covering the central front surface of the seat back 152, two front side seat surface layers 172, 174 for covering the surface of the side portion of the seat back 152, a seat back side surface layer 176 for covering the lid 166 of the air bag apparatus 154, and a rear seat surface layer 178 for covering the rear surface of the seat back 152.

Further, a front end portion 176A of the seat back side surface layer 176 and a rear end portion 174A of the front side seat surface layer 174 are sewn together with sewing thread 180 to form the seat back side surface layer 176 located substantially opposite to the side of the lid 166. The strength of the sewing at this sewn portion is set low by sewing both ends by one row of stitches as shown in the drawing, for example. Accordingly, this portion serves as a rupture portion. On the other hand, a rear end portion 176B of the seat back side surface layer 176 and a front end portion 178A of the rear seat surface layer 178 are respectively formed into loops and respectively sewn with sewing threads 182 and 184. Further, the rear end portion 176B and front end portion 178A, each of which has been sewn into a loop, are sewn together with sewing thread 186. The strength of the sewing at this sewn portion is set high by sewing both end portions 176B and 178A by two rows of stitches as shown in the drawing, for example. Accordingly, no rupture occurs at this sewn portion so that this portion serves as a hinge for the opening of the seat back side surface layer 176.

Thus, when the air bag 160 is inflated by a flow of gas injected from the inflator 158, the lid 166 is opened toward the outer side of the seat (i.e., in the direction indicated by arrow W in FIG. 25) about a hinge 166A provided at a rear side end thereof. As a result, the portion sewn between the front end portion 176A of the seat back side surface layer 176 and the rear end portion 174A of the front side surface layer 174 is broken by an opening force produced at this time.

However, in a seat structure having an air bag apparatus for a side impact, when a relatively easy-to-stretch material such as knit or the like is used for the surface layer 168 of the seat back 152, the surface layer 168 greatly stretches outwardly in the transverse direction of the seat in the initial stage of expansion of the air bag 160 as indicated by a two-dot chain line in FIG. 25 so that the sewn portion to be broken, which is formed by the sewing thread 180, becomes hard to break. This is most likely due to the inflation speed of the air bag 160 becoming slow and the shape of expanded configuration of the air bag 160 becoming unstable. Therefore, a relatively easy-to-stretch material such as knit or the like, which has been heretofore been used for the seat surface layer, cannot be used. As a result, the material for the seat surface layer is limited.

Easy-to-stretch materials have heretofore been used for the front and side seat surface layers with a view toward making it easy to fit the seat surface layer to the seat back (seat pad) to improve the outer appearance and improve the seating comfort.

Further, a structure shown in FIGS. 26 and 27 is known as another example of a conventional seat structure having a side impact air bag apparatus.

In the seat structure having a side impact air bag apparatus as shown in FIG. 26, an air bag apparatus 272 is disposed within a side portion 270A of a seat back 270. The air bag apparatus 272 is shaped in the form of a box whose longitudinal direction corresponds to the vertical direction of a seat.

As shown in FIG. 27, the air bag apparatus 272 is attached to a side frame 280, which serves as a strengthening member, of a seat back frame by an unillustrated mounting member. A portion of an air bag case 282, which is located at the side opposite the side frame 280, serves as a cover 282A. When an air bag 284 is inflated by a flow of gas injected from an inflator 283, the cover 282A opens outwardly in the transverse direction of the seat (i.e., in the direction indicated by arrow W in FIG. 27) about a hinge 282B provided at a vehicle longitudinal direction rear end of the cover 282A. Further, a stitch 288 of a seat cover 286 is broken due to the opening of the cover 282A.

However, in the above-described seat structure having a side impact air bag, in the initial stage of inflation of the air bag 284, a portion which covers the side portion 270A of the seat cover 286 is greatly deformed outwardly in the transverse direction of the seat by the opening of the cover 282A as indicated by an imaginary line in FIG. 27. Thereafter, the stitch 288 of the seat cover 286 is broken.

Thus, the sewing force of the stitch 288 is made extremely weak in order to prevent cover a reduction in inflation speed of the air bag 284 due to the deformation of the seat cover 286 and allow prompt inflation of the air bag 284. Alternatively, a complex structure for improving the performance of the inflator 283 or the like is required in order to increase the opening force of the cover 282A.

SUMMARY OF THE INVENTION

With the foregoing in view, it is an object of the present invention to provide a seat structure having a side impact air bag apparatus, which is capable of promptly and smoothly expanding a side impact air bag, without the material used for a seat being limited and without the seating comfort of the seat being adversely affected.

A first aspect of the present invention is a seat structure having a side impact air bag apparatus, the seat structure being constructed such that the air bag apparatus, which is integrated into a side portion of a seat back which side portion opposes a vehicle door, is activated at the time of a side impact such that a sewn portion of a seat surface layer, which is formed by sewing a front seat surface layer for covering the front of the seat back to a side seat surface layer for covering the side of the seat back, breaks and an air bag body inflates between a side portion of a vehicle body and the side of a vehicle occupant, comprising:

a sheet member provided inside the side seat surface layer integrally with the side seat surface layer, the sheet member being harder to stretch than the side seat surface layer, and one end of the sheet member being sewn to the sewn portion; and a fixing member provided inside the seat back, the fixing member being engaged with another end of the sheet member which is provided on the opposite side of the one end of the sheet member.

According to the first aspect of the present invention, when the air bag apparatus integrated into the side portion of the seat back frame which side portion opposes a vehicle door, is activated at the time a side impact occurs, the air bag is inflated to push and expand the seat surface layer. Since, at this time, the sheet member is provided inside the side seat surface layer and the other end thereof on the side opposite to the one end thereof is in engagement with the fixing member, the side seat surface layer is not stretched so far even if an easy-to-stretch material is used for the side seat surface layer. Thus, the expansion force of the air bag is transferred to the sewn portion between the front seat surface layer and the side seat surface layer without any loss, so that the sewn portion is broken relatively easily.

Therefore, according to the present invention, the side impact air bag can be inflated promptly and smoothly. Further, the material for the seat surface layer is not limited and the seating comfort is not adversely affected.

A second aspect of the present invention is a seat structure having a side impact air bag apparatus in which, in the first aspect of the present invention, the one end of the sheet member is tacked to the side seat surface layer and is, together with the side seat surface layer, sewn to the front seat surface layer by sewing thread at a position located at a vehicle transverse direction outer side of the position where the one end of the sheet member is tacked to the side seat surface layer. Further, an engaging member which, together with the side seat surface layer, is attached to the other end of the sheet member and is brought into engagement with the fixing member.

According to the second aspect of the present invention, one end of the sheet member is temporarily sewn on the side seat surface layer in advance, and in this state, the sheet member is sewn on the front seat surface layer together with the side seat surface layer by the sewing thread at a position located outwardly in the transverse direction of the seat back as seen from the position where the one end is temporarily sewn on the side seat surface layer to thereby fabricate the seat surface layer in a manner similar to a conventional manufacturing process. Therefore, it is unnecessary to greatly change the conventional manufacturing process. Further, an excellent effect is achieved in that the producibility is good.

A third aspect of the present invention is a seat structure having a side impact air bag apparatus in which, in the second aspect of the present invention, the fixing member is a wire fixed to a frame of the seat back.

According to the third aspect of the present invention, the engaging member attached to the side seat surface layer and the sheet member can be easily assembled to the wire fixed to the frame of the seat back by being engaged with the wire upon assembly.

A fourth aspect of the present invention is a seat structure having a side impact air bag apparatus, constructed such that the air bag apparatus, which is integrated into a side portion of a seat back which side portion opposes a vehicle door, is activated at the time of a side impact such that a sewn portion of a seat surface layer, which is formed by sewing a front seat surface layer for covering the front of the seat back to a side seat surface layer for covering the side of the seat back, breaks and an air bag body inflates between a side portion of a vehicle body and the side of a vehicle occupant, comprising:

a sheet member provided inside the side seat surface layer and provided such that a front end of the sheet member located at a vehicle longitudinal direction front side of the seat back is fixed to the side seat surface layer, the sheet member being harder to stretch than the side seat surface layer; and a fixing member provided inside the seat back, the fixing member being engaged with a vehicle longitudinal direction rear end of the sheet member located at a vehicle longitudinal direction rear side of the seat back.

In accordance with the fourth aspect of the present invention, at the side surface of the seat back which is a curved surface, when the side surface seat surface layer and the sheet member are sewn together at the peripheries thereof to form a two-ply layer and are then mounted to the seat back to cover the seat back, the side seat surface layer is pulled by the sheet member so that wrinkling occurs in the side seat surface layer. However, the upper and lower sides and rear end of the sheet member releases the side seat surface layer from being restrained by fixing only the front end of the sheet member to the side seat surface layer and bringing the rear end of the sheet member into engagement with the fixing member, so that it becomes hard for wrinkles to appear at the side seat surface layer. Further, excellent effects can be brought about in that the air bag for a side impact can be inflated promptly and smoothly, the material used for the seat surface layer is not limited, and the seating comfort is not adversely affected.

A fifth aspect of the present invention is a seat structure having a side impact air bag apparatus in which, in the fourth aspect of the present invention, the front end of the sheet member is tacked to the side seat surface layer and is, together with the side seat surface layer, sewn to the front seat surface layer by sewing thread at a position located at a vehicle transverse direction outer side of the position where the front end of the sheet member is tacked to the side seat surface layer. Further, an engaging member attached to the rear end of the sheet member is provided, and the rear end of the sheet member engages the fixing member through the engaging member.

According to the fifth aspect of the present invention, the front end of the sheet member is temporarily sewn on the side seat surface layer in advance, and in this state, the sheet member is sewn on the front seat surface layer together with the side seat surface layer by the sewing thread at the position located outwardly in the transverse direction of the seat back as seen from the position where the front end is temporarily sewn on the side seat surface layer to thereby fabricate the seat surface layer in a manner similar to a conventional manufacturing process. Therefore, it is unnecessary to greatly change the conventional manufacturing process. Further, upon assembly, the engaging member at the rear end of the sheet member may be formed at the fixing member, and hence assembly becomes easy. Furthermore, an excellent effect can be brought about in that produceability and assembly workability are good.

A sixth aspect of the present invention is a seat structure having a side impact air bag apparatus in which, in the first and fourth aspects of the present invention, the sheet member is shaped in the form of a strap having a width narrower than a vertically-extending width of the air bag body, and is disposed at a position including a vertically-extending central portion of the air bag body. (Here, "vertically-extending" means extending in the vertical (up-and-down) direction of the vehicle).

According to the sixth aspect of the present invention, since the width of the sheet member is narrower than the vertically-extending width of the air bag and the sheet member is provided at the position including the vertically-extending central portion of the air bag, stress produced upon inflation of the air bag is concentrated on a relatively narrow range of the sewn portion, including the central line of the vertically-extending width of the air bag, so that the sewn portion becomes easy to break. Further, an excellent effect can be brought about in that the time required for the air bag to expand can be shortened.

A seventh aspect of the present invention is a seat structure having a side impact air bag apparatus in which, in the first and fourth aspects of the present invention, a welt is provided at the sewn portion sewn to the front seat surface layer, the side seat surface layer and the sheet member, and is composed of a welt fabric and a welt cord. When the air bag expands, the welt remains on the side seat surface layer side in a region in which the welt is sewn on at least the sheet member.

According to the seventh aspect of the present invention, when the side impact air bag apparatus is mounted to a seat in which the welt is provided at the sewn portion between the front seat surface layer, the side seat surface layer and the sheet member, the air bag may be inflated from the rear side of the welt, or the air bag may be inflated from the front side of the welt, or the air bag may be inflated from the rear side of the welt on the one side and inflated from the front side of the welt on the other side in accordance with the vertical direction position of the seat. If the welt is unable to break at this time, the air bag becomes caught on the welt so that the necessary expanded configuration cannot be ensured. According to the present invention, however, when the air bag inflates, the welt remains on the side seat surface layer side at least in the sheet member range. Therefore, the air bag can expand to the required expanded configuration. An excellent effect is achieved in that the air bag can be expanded as intended.

An eighth aspect of the present invention provides a seat structure having a side impact air bag apparatus in which, in the seventh aspect of the present invention, the welt fabric is sewn by second sewing thread for sewing the side seat surface layer and the sheet member together, which second sewing thread is located at the seat inner side of the position of the first sewing thread for sewing the front seat surface layer, the side seat surface layer and the sheet member together.

According to the eighth aspect of the present invention, the welt is fixed to the side seat surface layer and the sheet member by the second sewing thread, and in this state, the portion of the welt at the position on the outer side of the welt is sewn on the front seat surface layer together with the side seat surface layer by the first sewing thread to thereby produce the seat surface layer. Therefore, it is unnecessary to greatly change the conventional manufacturing process. Further, an excellent effect can be brought about in that produceability is good.

A ninth aspect of the present invention provides a seat structure having a side impact air bag apparatus in which, in the eighth aspect of the present invention, the second sewing thread has a higher strength than a strength of the first sewing thread or has a smaller sewing pitch than a sewing pitch of the first sewing thread.

According to the ninth aspect of the present invention, the speed of expansion of the air bag can be adjusted by simply changing the strength or sewing pitch of the second sewing thread.

A tenth aspect of the present invention provides a seat structure having a side impact air bag apparatus in which, in the seventh aspect of the present invention, the sheet member is provided within a range of the vertically-extending width of the air bag body, and is provided so as to have a width greater than or equal to one-half of the vertically-extending width of the air bag body.

According to the tenth aspect of the present invention, uncontrollable regions of the sheet member at the time of the expansion of the air bag (i.e., regions at which the breaking of the seat surface layer cannot be controlled) are reduced. In other words, regions in which the air bag is inflated from the rear side of the welt on the one side and inflated from the front side of the welt on the other side according to the vertical direction position of the seat are reduced. Therefore, the air bag can be expanded as intended and can be inflated quickly toward the outer side of the seat surface layer due to the concentration of the stress at the time of the inflation of the air bag.

An eleventh aspect of the present invention provides a seat structure having a side impact air bag apparatus in which, in the seventh aspect of the present invention, the welt cord has at least one weak portion which is provided within a range of the vertically-extending width of the air bag body and breaks when the air bag body expands.

According to the eleventh aspect of the present invention, since the welt is broken from the weakened portion of the welt cord when the air bag is inflated from the rear side of the welt on the one side and inflated from the front side of the welt on the other side according to the vertical direction position of the seat, the welt does not interfere with the inflation of the air bag and the air bag can be expanded in a short time as intended.

A twelfth aspect of the present invention is a seat structure having a side impact air bag apparatus, which is constructed in such a manner that the air bag apparatus, which is integrated into a side portion of a seat back which side portion opposes a vehicle door, is activated at the time of a side impact such that a sewn portion provided at a seat surface layer ruptures and an air bag body expands between a side portion of a vehicle body and the side of a vehicle occupant, comprising:

a tensile force transfer member for connecting a side seat surface layer, which covers the side of the seat back, and a fixing member, which is provided inside the seat back, to each other.

According to the twelfth aspect of the present invention, when a load is applied to the side of the vehicle at the time of a side impact so as to activate the air bag apparatus attached to the side of a seat back frame, the air bag is inflated so as to push and expand a cover of an air bag case. Since, at this time, the side seat surface layer for covering the side portion of the seat back and the fixing member are coupled to each other by the tensile force transfer member via the sewn portion, the tensile force transfer member restrains the side seat surface layer from moving, so that the side seat surface layer is hardly displaced. Accordingly, the load that pushes and expands the cover of the air bag case due to inflation of the air bag, concentrates at the sewn portion. Therefore, the sewn portion can be instantaneously broken. Further, an excellent effect can be brought about in that the air bag can be promptly expanded with a simple structure.

A thirteenth aspect of the present invention provides a seat structure having a side impact air bag apparatus in which, in the twelfth aspect of the present invention, the tensile force transfer member is provided at the vehicle transverse direction inner side of the air bag case so as to extend along the outer periphery of the air bag case provided at the air bag apparatus. The air bag case has an aperture defined in a portion thereof opposed to the tensile force transfer member.

According to the thirteenth aspect of the present invention, a portion of the air bag extends out through the aperture of the air bag case so as to press the tensile force transfer member in the initial stage of expansion of the air bag, thereby pulling, toward the inner side of the seat, the side surface layer which covers the side of the seat back. As a result, an excellent effect is achieved in that the seat surface layer can be more rapidly restrained, the stitch can be instantaneously broken and the air bag can be expanded more quickly.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

A first embodiment of a seat structure of the present invention, which has a side impact air bag apparatus, will hereinafter be described with reference to FIGS. 1 through 5. Incidentally, the terms "outside" and "outer side" used in the specification indicate the side of the seat back 12 toward the vehicle transverse direction outer side. Further, the terms "inside" and "inner side" indicate the side of the seat back 12 toward the inner side in the transverse direction of the vehicle. Further, note that the transverse direction of the seat back 12 is the same as the transverse direction of the vehicle.

Figure 4:
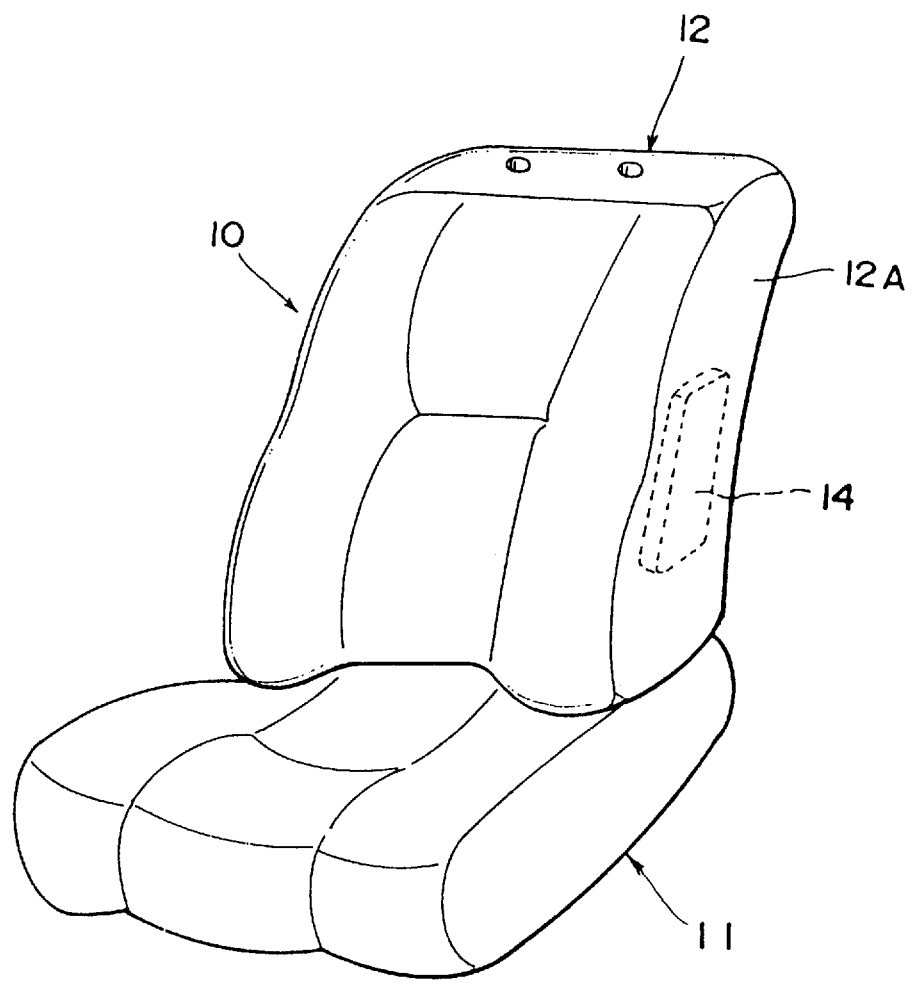
FIG. 4 is a perspective view showing a seat to which the seat structure according to the first embodiment of the present invention is applied.

As shown in FIG. 4, a front seat 10 employed in the first embodiment comprises a seat cushion 11 on which an occupant is seated, the seat back 12 which is inclinably attached to the rear end of the seat cushion 11 and used as an occupant backrest, and an unillustrated headrest mounted to the upper end of the seat back 12 so that the height thereof can be adjusted. The seat cushion 11, the seat back 12 and the headrest are principal components of the front seat 10.

Figure 1:
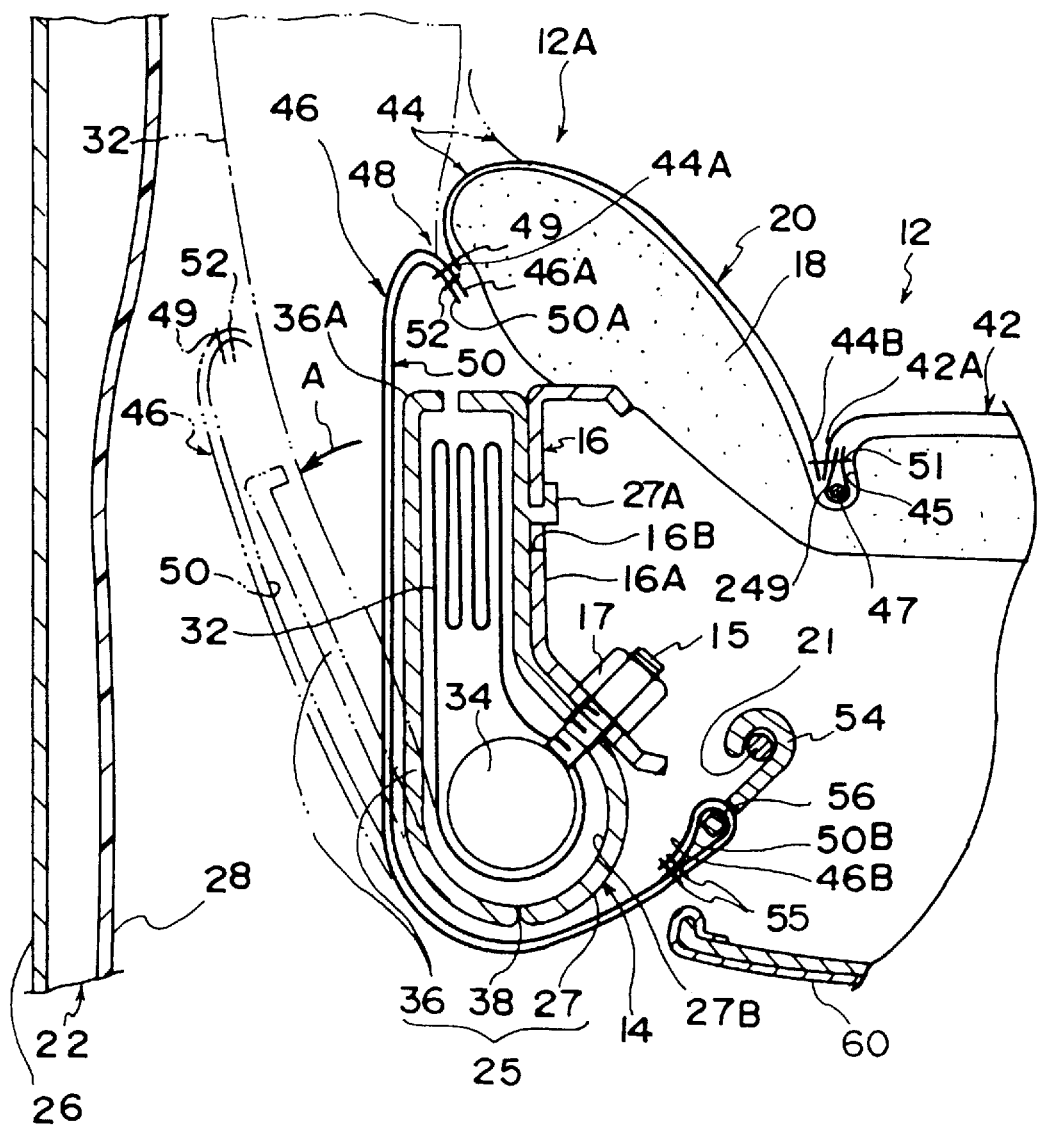
FIG. 1 is a horizontal cross-sectional view showing a side portion of a seat structure provided with a side impact air bag apparatus, according to a first embodiment of the present invention.

As shown in FIG. 1, the seat back 12 includes a seat back frame 16 which is assembled in the form of a substantially rectangular frame and forms a skeletal member, a seat back pad 18 attached to the front side of the seat back frame 16 and set to a predetermined hardness by using a resin such as a urethane resin or the like, and a seat back surface layer 20 for covering the surface of the seat back pad 18.

Further, an air bag apparatus 14 for a side impact is incorporated in a side portion of the seat back 12, which side portion is located at the side door 22 side of the seat back 12. Incidentally, only a door inner panel 26 and a door trim 28, which form a part of the side door 22, are illustrated in FIG. 1.

Figure 3:
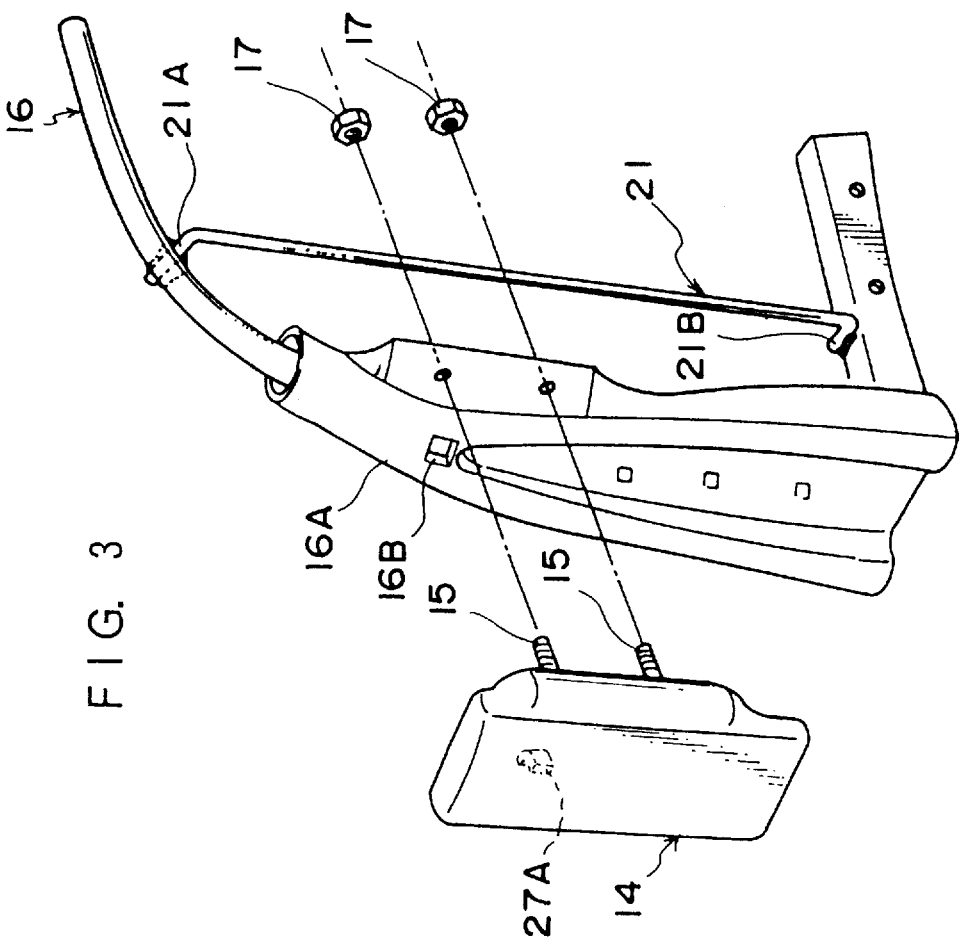
FIG. 3 is a perspective view illustrating an expanded state of a side portion of a seat back frame of the seat structure according to the first embodiment of the present invention.

As shown in FIG. 3, bolts 15 are vertically provided within the air bag apparatus 14. The air bag apparatus 14 is fixed to a side portion 16A of the seat back frame 16 by the bolts 15 and nuts 17. Further, a metal wire 21 used as a fixing member is disposed inside the side portion 16A of the seat back frame 16 as seen from the transverse direction of the seat back 12. An upper end 21A and a lower end 21B of the metal wire 21 are respectively fixed to the seat back frame 16 by welding.

As shown in FIG. 1, a hook 27A is formed on the back (i.e., the surface opposed to the seat back frame 16) of a base 27 of an air bag case 25. The hook 27A engages with a notch 16B (refer to FIG. 3) defined in the side portion 16A of the seat back frame 16.

A folded air bag 32 is accommodated within the air bag case 25. A cylindrical inflator 34 is disposed within an inflator storage portion 27B which is provided at the base of the base 27 so as to be depressed toward the transverse direction inner side of the seat back 12. The inflator 34 is provided within the air bag 32.

The inflator 34 may be a type filled with gas generating materials or a high-pressure gas filled type. The construction of the inflator 34 will be briefly described hereinafter by way of example. The former type of inflator (i.e., the type filled with gas generating materials) includes a cylindrical housing having a bottom and a plurality of gas injection holes defined in the peripheral surface thereof, gas generating materials which are provided within the housing and produce gas when burned, a filter for removing fragments produced after the burning of the gas generating materials, and an electric ignition device mounted to an end of the housing on the aperture side thereof so as to burn the gas generating materials. The latter type of inflator (i.e., the high-pressure gas filled type) includes a cylindrical housing having a bottom, a pressure bulkhead provided within the housing, mixed gas such as argon/helium or the like charged into a chamber partitioned and formed by the pressure bulkhead and the housing, a moving member which is movably disposed in the vicinity of the pressure bulkhead and breaks the pressure bulkhead due to the movement thereof, and an electric ignition device mounted to an end of the housing on the aperture side thereof so as to displace the moving member. In either type of inflators, the ignition device is activated by a sensor for detecting a state in which a side impact has occurred. In the air bag apparatus 14, since the air bag 32 to be described later is relatively small and has a reduced gas capacity, the high-pressure gas filled type inflator is often used.

Further, an outer portion of the air bag case 25 serves as a lid 36. When the air bag 32 is inflated by the flow of the gas injected from the inflator 34, the lid 36 is opened toward the transverse direction outer side of the seat back 12 (i.e., in the direction indicated by arrow A in FIG. 1) about a hinge 38 provided at a rear side end of the air bag case 25.

The seat back surface layer 20 is divided into a plurality of seat surface layers. More specifically, the seat back surface layer 20 is divided into a front main surface layer 42 that forms a part of a front seat surface layer for covering the front of the seat back pad 18 at the transverse direction central portion of the seat back 12, a front side surface layer 44 that forms a part of the front seat surface layer for covering the front of the side portion of the seat back 12, and a seat back side surface layer 46 which serves as a side seat surface layer for covering the side surface of the side portion of the seat back 12 (i.e., the surface substantially opposed to the side door 22) and the lid 36 of the air bag apparatus 14.

The seat back surface layer 20 is formed of a relatively easy-to-stretch material such as knit or the like.

A terminal portion 46A of the seat back side surface layer 46, which is provided at the front side of the seat back side surface layer 46 in the longitudinal direction of the vehicle, is sewn to an outer terminal portion 44A of the front side surface layer 44 by sewing thread 49. An inner terminal portion 44B of the front side surface layer 44 is sewn to an outer terminal portion 42A of the front main surface layer 42 by sewing thread 51 together with a strap 249 having a loop-shaped section, which is formed so that a hooking wire 47 is inserted into a longitudinal groove 45 defined in the seat back pad 18.

A sewn portion 48, which is formed by sewing together the front terminal portion 46A of the seat back side surface layer 46 and the outer terminal portion 44A of the front side surface layer 44, is disposed in the vicinity of the front side of a seat longitudinal direction front edge portion 36A of the lid 36 of the air back case 25. When the air bag 32 is inflated, the sewn portion 48 is broken.

A cotton cloth 50, which serves as a sheet member and is a hard-to-stretch fabric, is provided at the inner side of the seat back side surface layer 46. A terminal portion 50A of the cotton cloth 50 on the seat longitudinal direction front side is temporarily sewn to the terminal portion 46A of the seat back side surface layer 46 with tacking thread 52. In this state, the cotton cloth 50 is, together with the seat back side surface layer 46, sewn to the front side surface layer 44 by the sewing thread 49 at a position further toward the vehicle outer side of the position where the terminal portion 50A is temporarily sewn to the terminal portion 46A.

Figure 2:
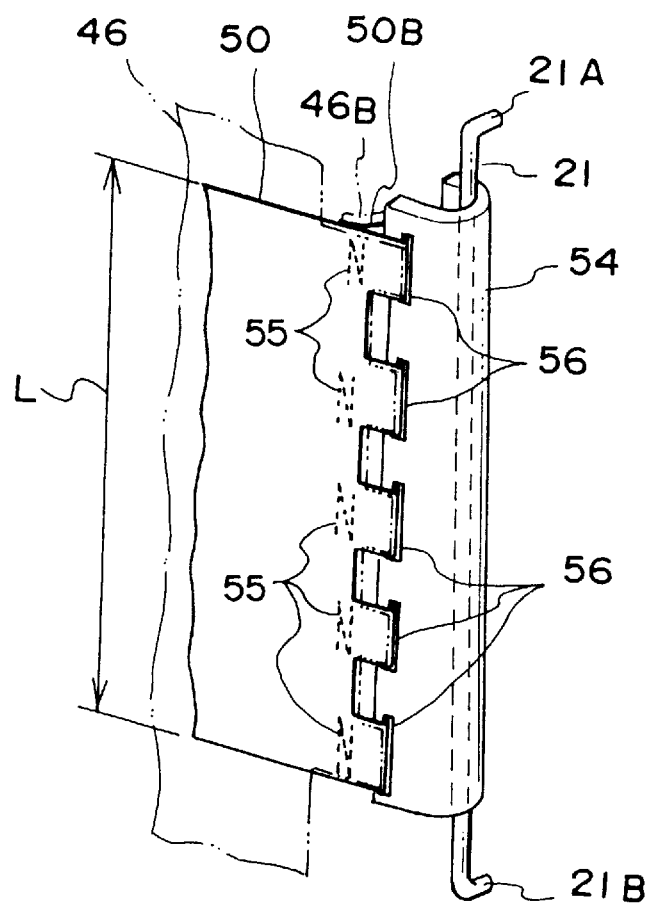
FIG. 2 is a perspective view illustrating a terminal portion on the rear side of a side seat surface layer of the seat structure according to the first embodiment of the present invention.

As shown in FIG. 2, a vertically-extending width L of the cotton cloth 50, which runs in the direction extending substantially along the upward and downward directions of the seat back 12 (i.e., the vertical direction of the vehicle), is set to a length substantially identical to a vertically-extending length of the lid 36 of the air bag case 25. Together with a terminal portion 46B of the seat back side surface layer 46 on the rear side thereof, a terminal portion 50B of the cotton cloth 50, which is located on the rear side thereof, passes through through holes 56 defined in a hook 54 used as an engaging member, and is folded back. The folded-back portion is sewn to a main portion of the cotton cloth 50 by sewing thread 55. The hook 54 thusly attached to the terminal portion 46B and the terminal portion 50B is brought into engagement with the wire 21.

Numeral 60 in FIG. 1 designates a part of a backboard attached to the reverse side of the seat back 12.

The operation of the first embodiment will now be described.

In the seat structure having an air bag apparatus used for a side impact, according to the first embodiment, when the inflator 34 of the air bag apparatus 14 is activated at the time of a side impact, the air bag 32 is inflated by the flow of gas injected from the inflator 34 so as to push and open the lid 36 of the air bag case 25 in the direction indicated by arrow A in FIG. 1.

The cotton cloth 50 is provided inside the seat back side surface layer 46 integrally with the seat back side surface layer 46, and the terminal portion 46B of the seat back side surface layer 46 on the rear side thereof and the terminal portion 50B of the cotton cloth 50 on the back side thereof are coupled to the wire 21 through the hook 54. Therefore, at this time, stress, which pushes and opens the lid 36 of the air bag case 25 due to the action of inflation of the air bag 32, is concentrated at the sewn portion 48 through the cotton cloth 50.

Thus, the sewn portion 48 can be instantaneously broken so that the air bag 32 can immediately inflate as indicated by the two-dot chain line in FIG. 1. Accordingly, the material for the seat back side surface layer 20 is not limited to a hard-to-stretch material.

In the aforementioned seat structure as well, since the cotton cloth 50, which is used as the hard-to-stretch fabric, is disposed only inside the seat back side surface layer 46, the cotton cloth 50 hardly affects the seating comfort of the seat.

Figure 5:
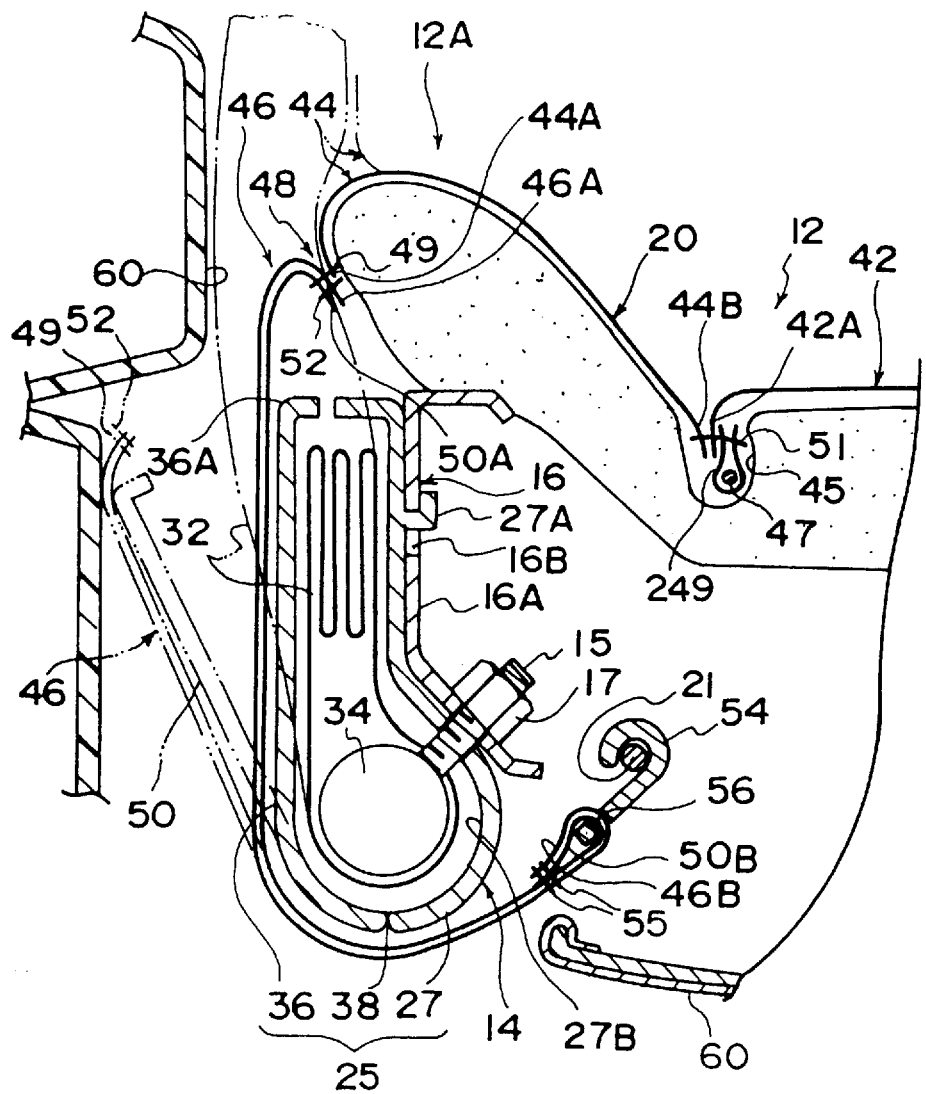
FIG. 5 is a horizontal cross-sectional view showing a side portion of the seat structure according to the first embodiment of the present invention, and illustrating a state in which a seat back has been moved toward a rear of the vehicle.

Further, in the aforementioned seat structure, even when the seat back 12 is displaced toward the rear of a vehicle and the air bag apparatus 14 is positioned further toward the rear of the vehicle than a center pillar garnish 60 as shown in FIG. 5, the sewn portion 48 is instantaneously broken after the opening of the lid 36 of the air bag case 25. Thus, since the air bag 32 is inflated toward the front of the vehicle through the space between the seat back 12 and the inner side of the center pillar garnish 60 which protrudes inwardly in the transverse direction of the vehicle, as indicated by a two-dot chain line in FIG. 5, the air bag 32 can be smoothly expanded.

In the aforementioned seat structure, the front terminal portion 50A of the cotton cloth 50 is sewn to the front terminal portion 46A of the seat back side surface layer 46 with the tacking thread 52. Therefore, in the state in which the terminal portion 50A has been temporarily sewn to the terminal portion 46A, the outer position thereof, i.e., the outside of the sewn portion, is sewn to the front side surface layer 44 together with the seat back side surface layer 46 by the sewing thread 49 to thereby fabricate the seat surface layer 20 in a manner similar to a conventional manufacturing process. Thus, produceability is improved because it is unnecessary to greatly change the conventional manufacturing process.

Further, in the aforementioned seat structure, since the hook 54 attached to the rear terminal portion 50B of the cotton cloth 50 and the rear terminal portion 46B of the seat back side surface layer 46 may be engaged with the wire 21 at the time of assembly, assembly workability becomes good.

Note that the hard-to-stretch fabric employed in the first embodiment is not limited to the cotton cloth 50.

In the aforementioned seat structure, the rear terminal portion 50B of the cotton cloth 50 is coupled to the wire 21 with the hook 54 as shown in FIG. 1. However, the portion to which the rear terminal portion 50B of the cotton cloth 50 is fixed is not limited to the wire 21. The terminal portion 50B may be connected to another fixing member on the seat side such as the side portion 16A of the seat back frame 16 or the like.

Figure 6:
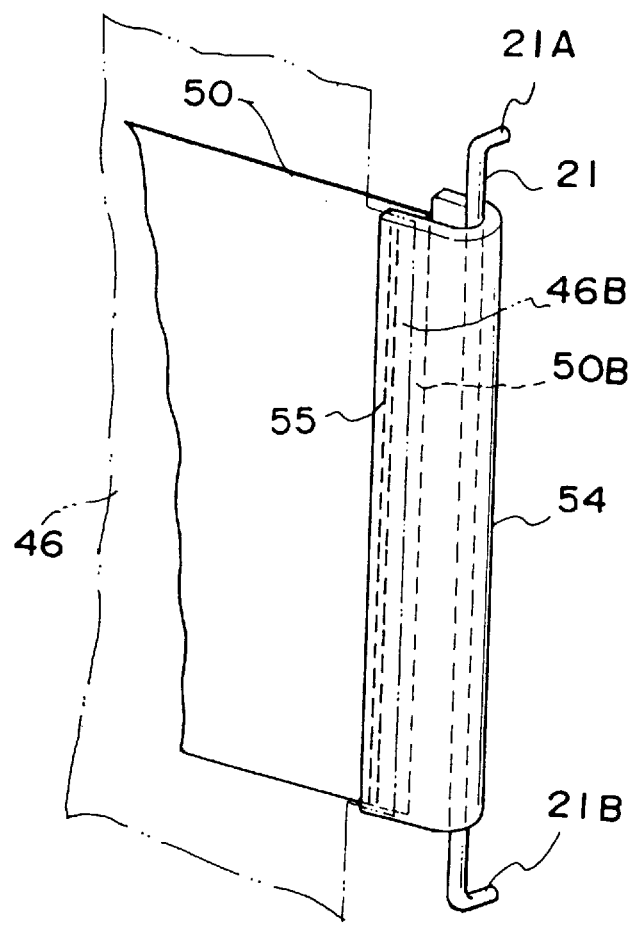
FIG. 6 is a perspective view showing a terminal portion on the rear side of a side seat surface layer of a seat structure provided with a side impact air bag apparatus, according to a modification of the -first embodiment of the present invention.

Moreover, in the aforementioned seat structure, as shown in FIG. 2, the rear terminal portion 50B of the cotton cloth 50 is, together with the rear terminal portion 46B of the seat back side surface layer 46, folded back through the through holes 56 defined in the hook 54 used as the engaging member. The folded-back portion is sewn to the main portion of the cotton cloth 50 by the sewing thread 55. However, the connecting of the rear terminal portion 50B of the cotton cloth 50 and the hook 54 is not limited to this structure. As shown in FIG. 6, the rear terminal portion 50B of the cotton cloth 50 may, together with the rear terminal portion 46B of the seat back side surface layer 46, be directly sewn to the hook 54 by the sewing thread 55.

Figure 7:
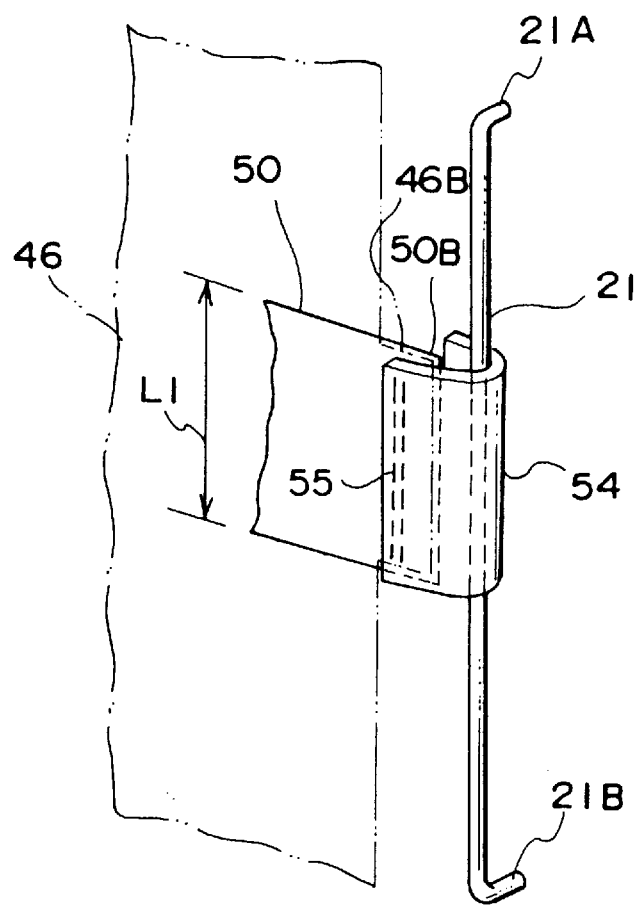
FIG. 7 is a perspective view illustrating a terminal portion on the rear side of a side seat surface layer of a seat structure provided with a side impact air bag apparatus, according to another modification of the first embodiment of the present invention.

In the aforementioned seat structure, the vertically-extending width L of the cotton cloth 50 shown in FIG. 2 is set to a length substantially identical to the vertically-extending length of the lid 36 of the air bag case 25. However, the width L is not necessarily limited to this length. As shown in FIG. 7, the width L may be set to a length L1 shorter than the vertically-extending length of the lid 36 of the air bag case 25. Further, the cotton cloth 50 may be disposed at an outer side of a region of the lid 36 which opens early on in the course of opening of the lid 36, so that the stress is concentrated at a relatively narrow area in a relatively early time when the lid 36 opens. On the other hand, the cotton cloth 50 used as the hard-to-stretch material may be disposed over the entire surface of the inside of the seat back side surface layer 46.

Further, the cotton cloth 50 which is used as the hard-to-stretch material is set so as to be slightly longer than the seat back side surface layer 46, and both terminal portions 50B and 46B are sewn in advance to the seat back side surface layer 46 with slack. It is therefore possible to easily fit the seat surface layer 20 to the seat back pad 18 so as to improve the external appearance. If the difference in length between the cotton cloth 50 and the seat back side surface layer 46 is set to about 10 mm, for example, there is no adverse effect on the expansion of the air bag 32.

A second embodiment of the present invention, which is a seat structure having a side impact air bag apparatus, will now be described with reference to FIGS. 8 through 10.

The same elements of structure as those employed in the first embodiment are identified by the same reference numerals, and their description will be omitted.

Figure 8:
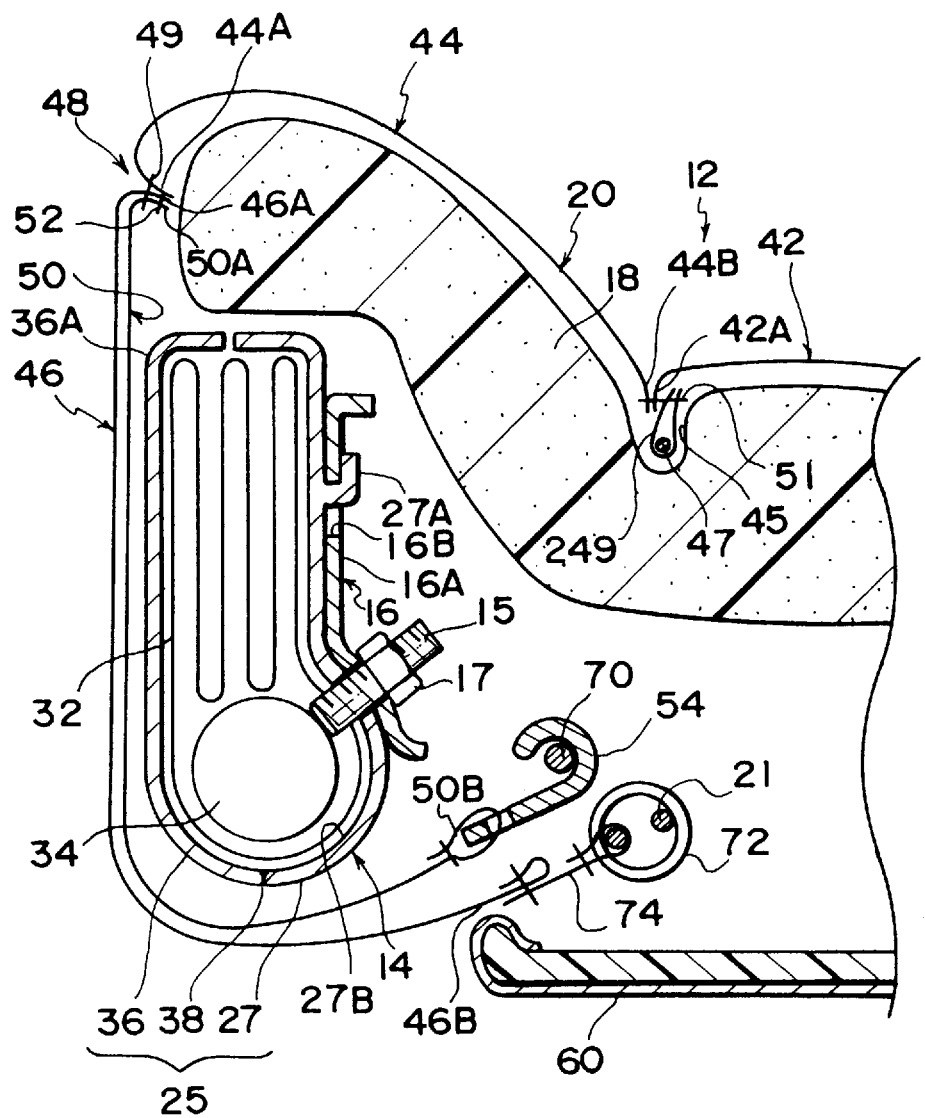
FIG. 8 is a horizontal cross-sectional view illustrating a side portion of a seat structure provided with a side impact air bag apparatus, according to a second embodiment of the present invention.

In the seat structure according to the second embodiment as shown in FIG. 8, a hook 54 attached to a terminal portion 50B of the rear side of a cotton cloth 50 used as a hard-to-stretch fabric engages a hard-to-deform wire 70 which is used as a fixing member of the seat.

Figure 9:
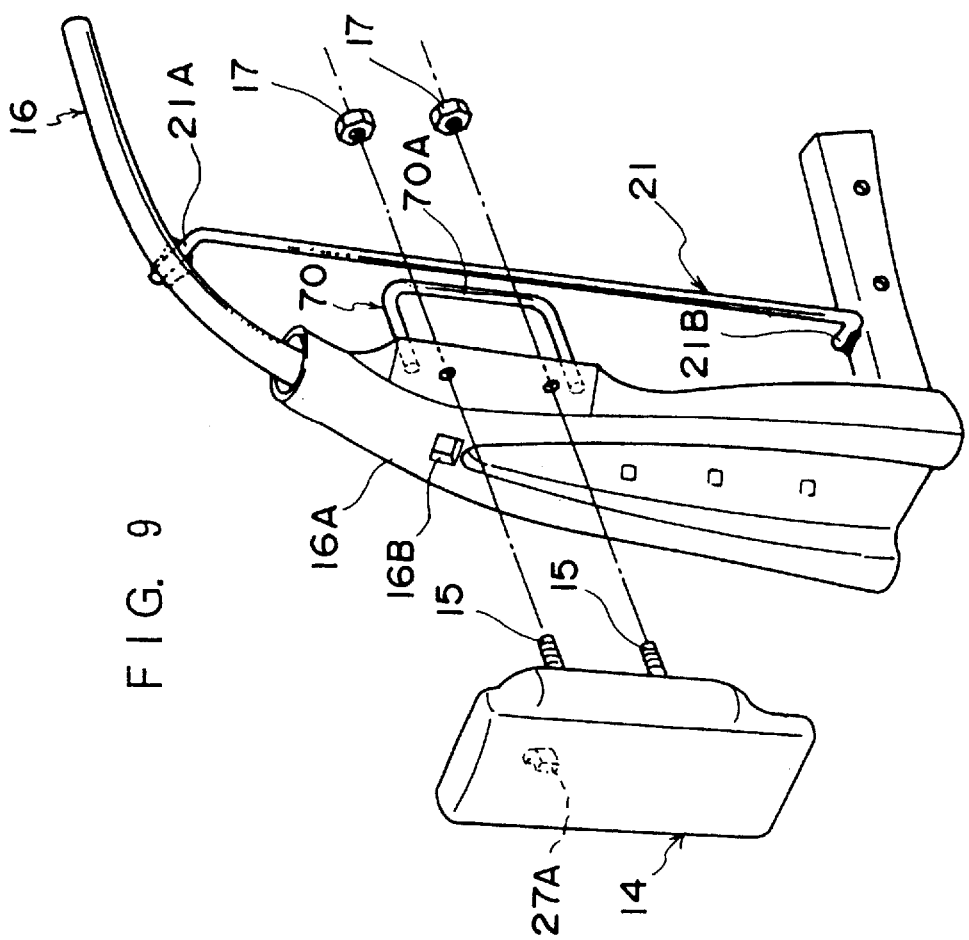
FIG. 9 is a perspective view showing an expanded state of a side portion of a seat back frame of the seat structure shown in FIG. 8.

As shown in FIG. 9, the wire 70 is welded to an upper portion of a side portion 16A of a seat back frame 16 and the longitudinal direction of an engaging portion 70A extends so as to be substantially parallel to the longitudinal direction of a wire 21.

As shown in FIG. 8, a mounting fabric 74 to which a hog ring 72 is attached, is sewn to a terminal portion 46B of the rear side of a seat back side surface layer 46 and the hog ring 72 is brought into engagement with the wire 21.

Figure 10:
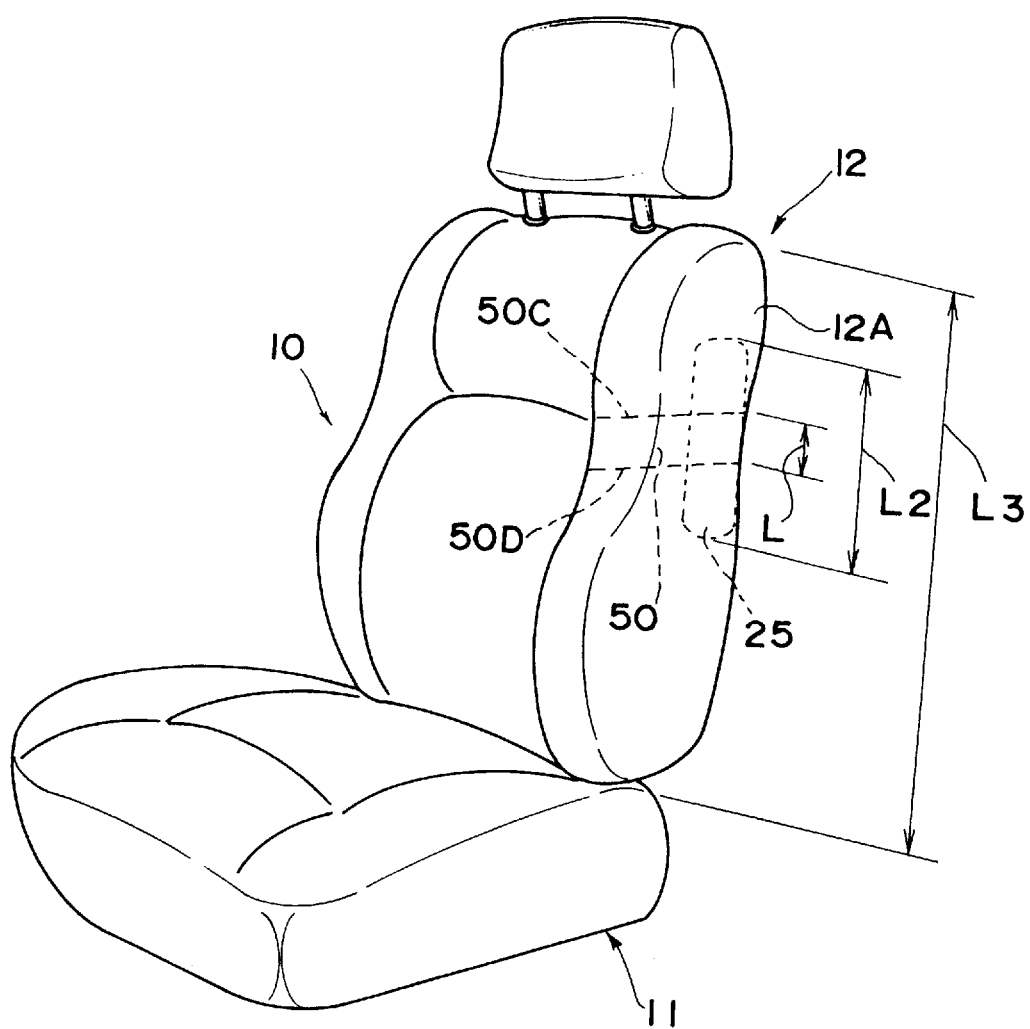
FIG. 10 is a perspective view showing a seat to which the seat structure shown in FIG. 8 is applied.

As shown in FIG. 10, a vertically-extending length L of the cotton cloth 50 is set so as to be shorter than a vertically-extending length L2 of an air bag case 25, i.e., the length L is set so as to be much shorter than a height L3 of a seat back 12. An upper side 50C and a lower side 50D of the cotton cloth 50 are not restrained.

In the present embodiment, the rear terminal portion 50B of the cotton cloth 50 and the rear terminal portion 46B of the seat back side surface layer 46 are respectively brought into engagement with the wires 21 and 70 separately from each other. However, the terminal portions 50B and 46B may be engaged with a single wire (not shown) formed so as to be bent in a crank form.

The operation of the second embodiment will now be described.

In the seat structure according to the second embodiment, when an inflator 34 of the air bag apparatus 14 is activated at the time of a side impact, an air bag 32 is inflated by the flow of gas injected from the inflator 34 so as to push and open a lid 36 of the air bag case 25.

At this time, the cotton cloth 50 is provided inside the seat back side surface layer 46, the rear terminal portion 46B of the seat back side surface layer 46 engages the wire 21 through the mounting fabric 74 having the hog ring 72, and the rear terminal portion 50B of the cotton cloth 50 is in engagement with the wire 70 through the hook 54. Therefore, stress, which pushes and opens the lid 36 of the air bag case 25 due to inflation of the air bag 32, acts directly on a sewn portion 48 through the cotton cloth 50. Further, since the vertically-extending length L of the cotton cloth 50 is set so as to be much shorter than the height L3 of the seat back 12, the stress is concentrated on the terminal portion 50A at the front side of the cotton cloth 50.

Thus, the sewn portion 48 can be instantaneously broken so that the air bag 32 is promptly inflated. Accordingly, the material for the seat back side surface layer 46 is not limited to a hard-to-stretch material.

In the aforementioned seat structure according to the second embodiment as well, since the cotton cloth 50 used as the hard-to-extent fabric is disposed only within a very narrow range at the inner side of the seat back side surface layer 46, the cotton cloth 50 hardly affects the seating comfort of the seat.

Further, in the aforementioned seat structure, since the rear terminal portion 50B of the cotton cloth 50 used as the hard-to-stretch fabric is separated from the rear terminal portion 46B of the seat back side surface layer 46 and the upper and lower sides 50C and 50D are not restrained, it is difficult for wrinkling to occur in the seat back side surface layer 46.

Figure 11:
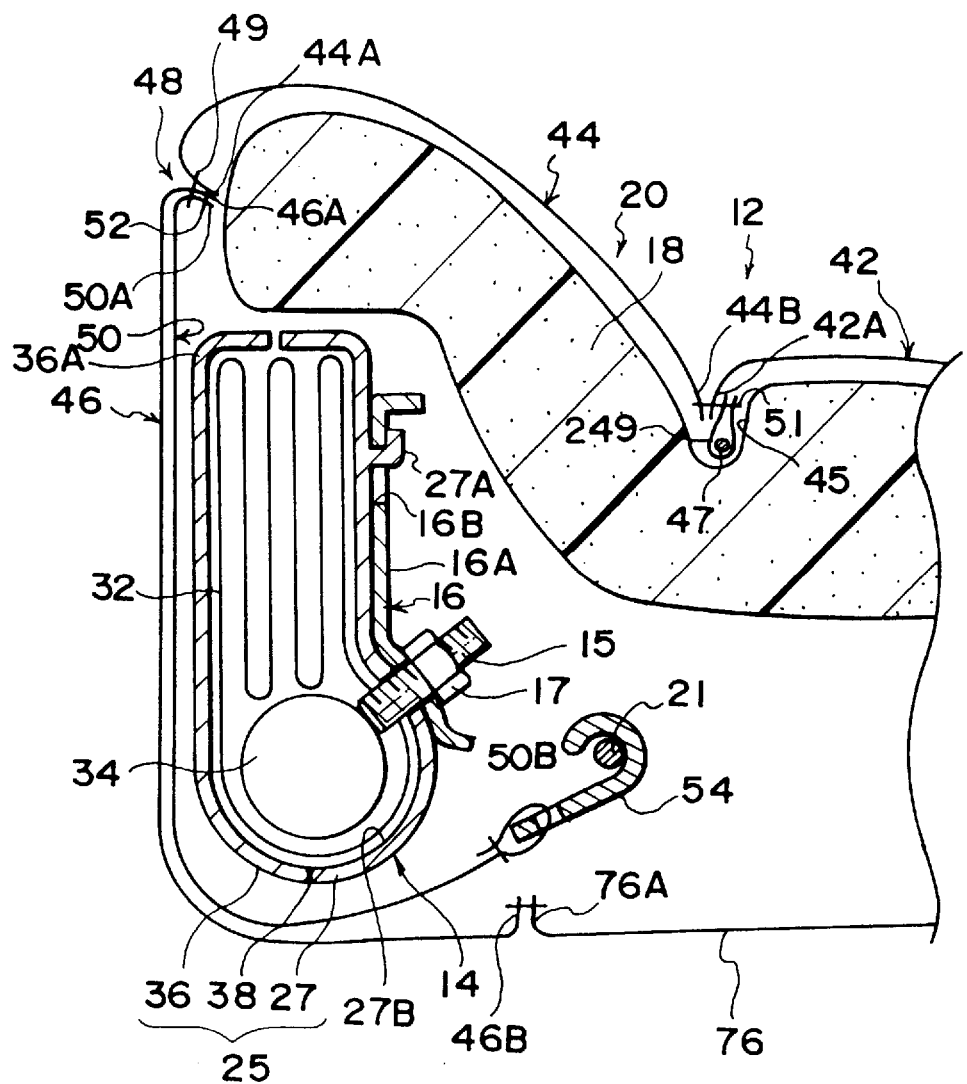
FIG. 11 is a horizontal cross-sectional view illustrating a side portion of a seat structure provided with a side impact air bag apparatus, according to a modification of the second embodiment of the present invention.

In the aforementioned seat structure, the seat having a back board 60 mounted to the back of the seat back 12 is used. However, the seat structure of the present invention can also be applied to a backboard-free seat wherein a terminal portion 46B of the rear side of a seat back side surface layer 46 is sewn to a terminal portion 76A of a rear-surface seat surface layer 76 as shown in FIG. 11.

A third embodiment of the present invention, which is a seat structure having a side impact air bag apparatus, will now be described with reference to FIGS. 12 through 17.

Incidentally, the same elements of structure as those employed in the second embodiment are identified by the same reference numerals and their description will be omitted.

Figure 12:
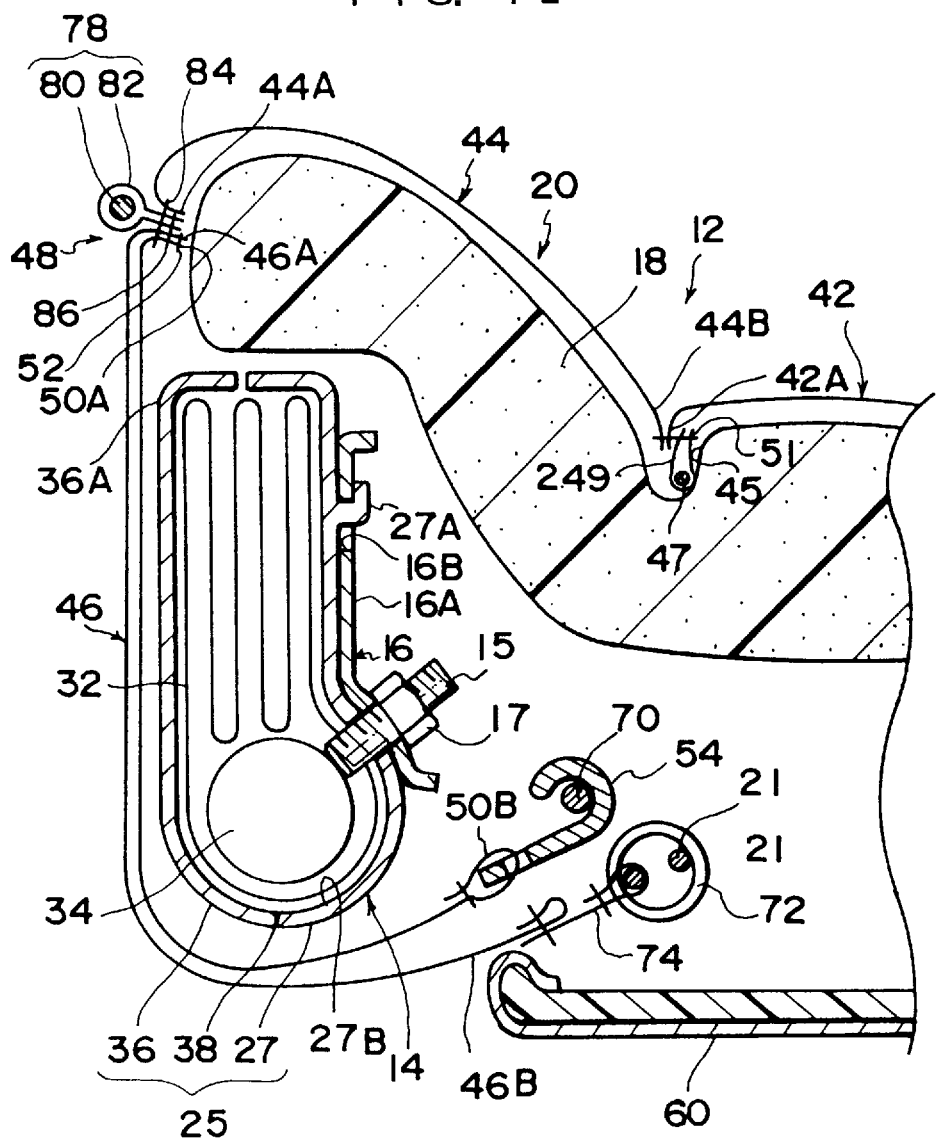
FIG. 12 is a cross-sectional view showing a side portion of a seat structure provided with a side impact air bag apparatus, according to a third embodiment of the present invention.

In the seat structure shown in FIG. 12, a welt 78 is provided at a sewn portion 48 formed by sewing a terminal portion 46A of the front side of a seat back side surface layer 46 to a terminal portion 44A of the outer side of a front side surface layer 44. The welt 78 is an ornamental trim for hiding the stitches so as to provide a high-class feeling, and is composed of a welt cord 80 and a welt fabric 82. The welt cord 80 is made of vinyl chloride. Further, the welt cord 80 has a rigidity which does not result in a corrugated state when the welt cord 80 is sewn to the seat surface layer, and will not break due to a vehicle occupant rubbing against the welt cord 80 when he/she gets in and out of the vehicle. The vehicle occupant is able to feel the softness of the welt cord 80.

Figure 13A:
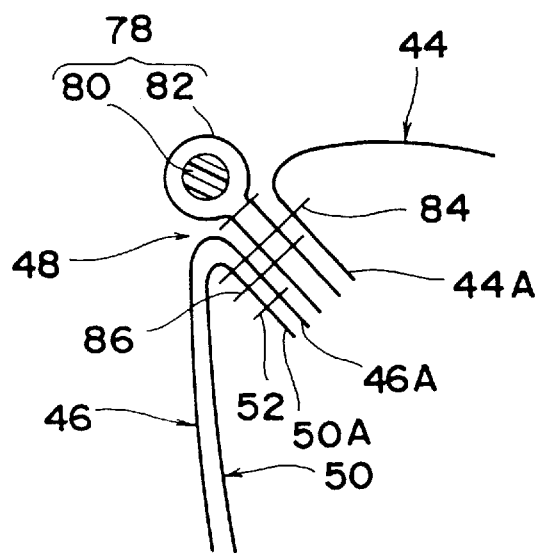
FIG. 13A is a cross-sectional view taken along line 13—13 of FIG. 14.
Figure 13B:
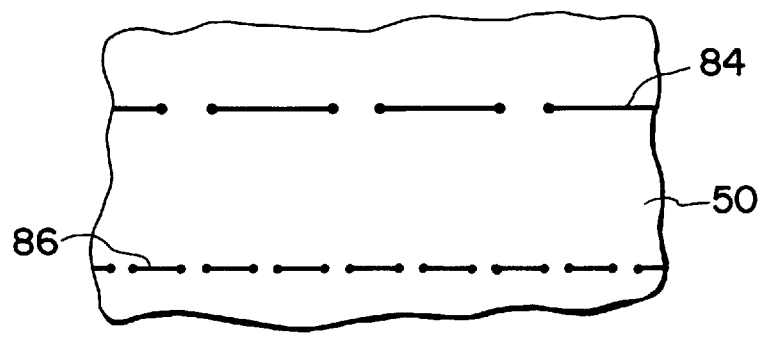
FIG. 13B is a detail of the stitching in FIG. 13A.

As shown in FIG. 13A, a first sewing thread 84, which is provided on the outermost side of the sewn portion 48, sews together the front terminal portion 46A of the seat back side surface layer 46, the outer terminal portion 44A of the front side surface layer 44, a terminal portion 50A on the front side of a cotton cloth 50, and the welt cord 82. Further, a second sewing thread 86, which is provided at the inner side of the first sewing thread 84 as seen in the transverse direction of the seat, sews together the front terminal portion 46A of the seat back side surface layer 46, the front terminal portion 50A of the cotton cloth 50, and the welt cord 82. The strength of the second sewing thread 86 is greater than that of the first sewing thread 84, or the sewing pitch of the second sewing thread 86 is smaller than that of the first sewing thread 84 as shown in FIG. 13B.

Figure 14:
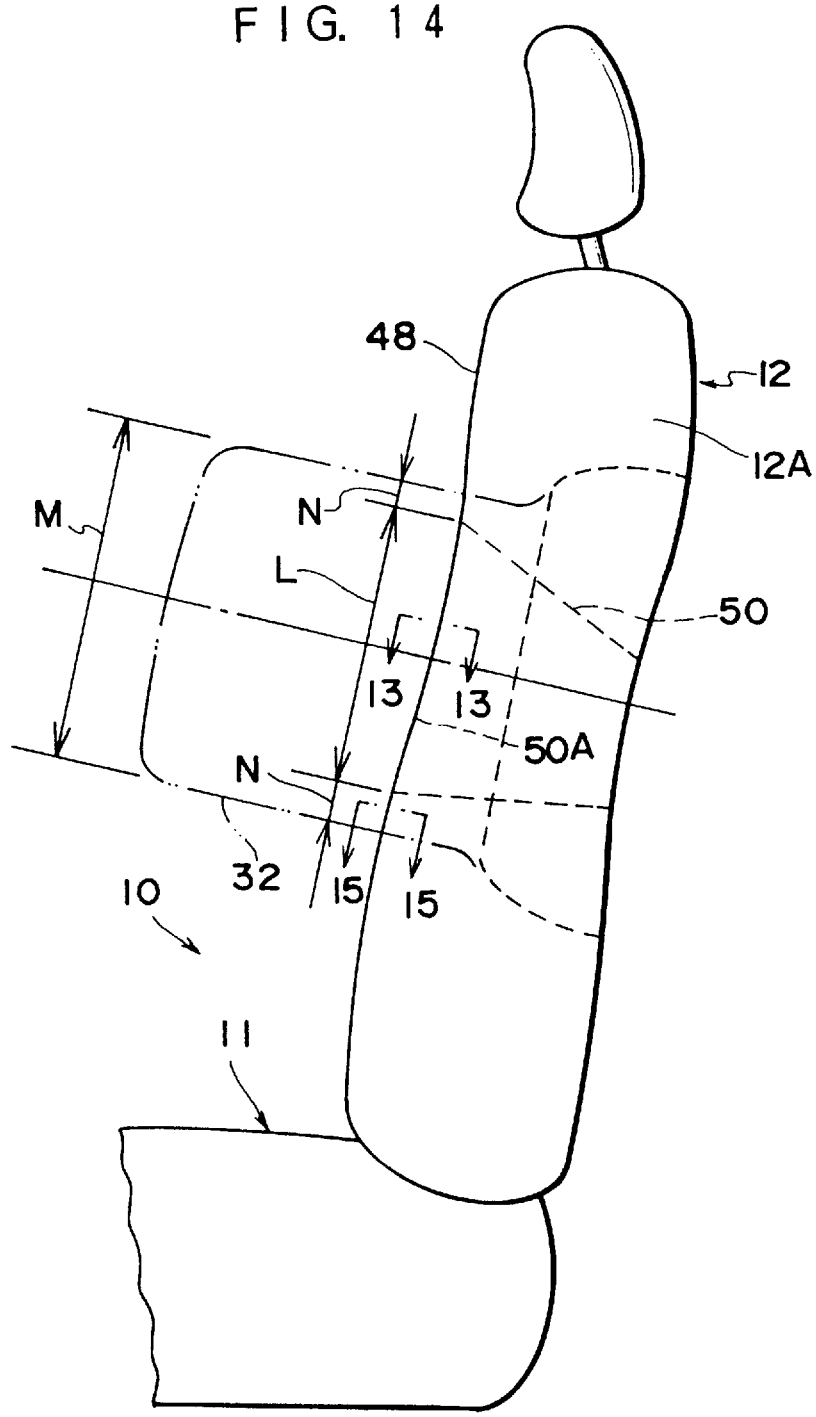
FIG. 14 is a side view illustrating a seat to which the seat structure shown in FIG. 12 is applied.

In the sewn portion 48 provided with the welt 78 of the seat back 12 as shown in FIG. 14, the cotton cloth 50 is provided within a range of a vertically-extending width M of an air bag 32. Further, a vertically-extending width L of the front terminal portion 50A of the cotton cloth 50 is broader than a vertically-extending width of a terminal portion 50B of the rear side of the cotton cloth 50, and is set to be greater than or equal to one-half of the width M of the air bag 32, preferably, $M > L \geqq 0.6M$.

The operation of the third embodiment will now be described.

In the seat structure according to the third embodiment, when an inflator 34 of the air bag apparatus 14 is activated at the time of a side impact as shown in FIG. 12, the air bag 32 is inflated by the flow of gas injected from the inflator 34 so as to push and open a lid 36 of an air bag case 25.

At this time, the cotton cloth 50 is provided inside the seat back side surface layer 46, the rear terminal portion 46B of the seat back side surface layer 46 engages a wire 21 through a mounting fabric 74 having a hog ring 72, and the rear terminal portion 50B of the cotton cloth 50 is in engagement with a wire 70 through a hook 54. Therefore, stress, which pushes and opens the lid 36 of the air bag case 25 due to the inflation of the air bag 32, is directly concentrated at the sewn portion 48 through the cotton cloth 50.

In this case, the sewn portion 48 may break in one of the following three ways.

Figure 15:
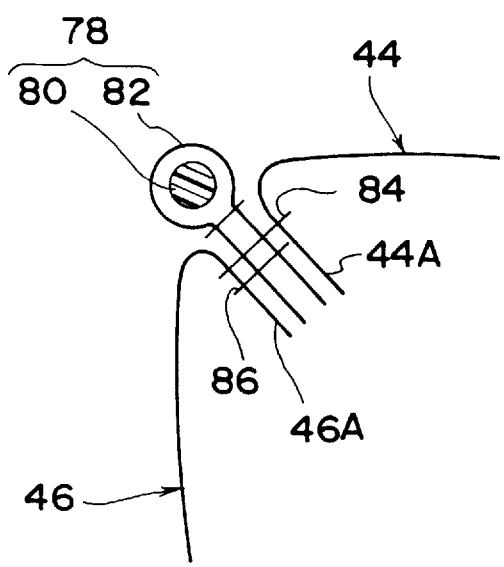
FIG. 15 is a cross-sectional view taken along line 15—15 of FIG. 14.

1. In a case in which the first sewing thread 48 is broken at the sewn portion 48:

The welt 78 is sewn on the seat back side surface layer 46 with the second sewing thread 86 even at the portion (corresponding to portion of the range L shown in FIG. 14) at which the cotton cloth 50 is sewn, and at portions above and below this portion, whose cross sections are illustrated in FIG. 15. Therefore, in this case, the welt 78 is brought into a state of being fixed to only the seat back side surface layer 46.

Figure 16:
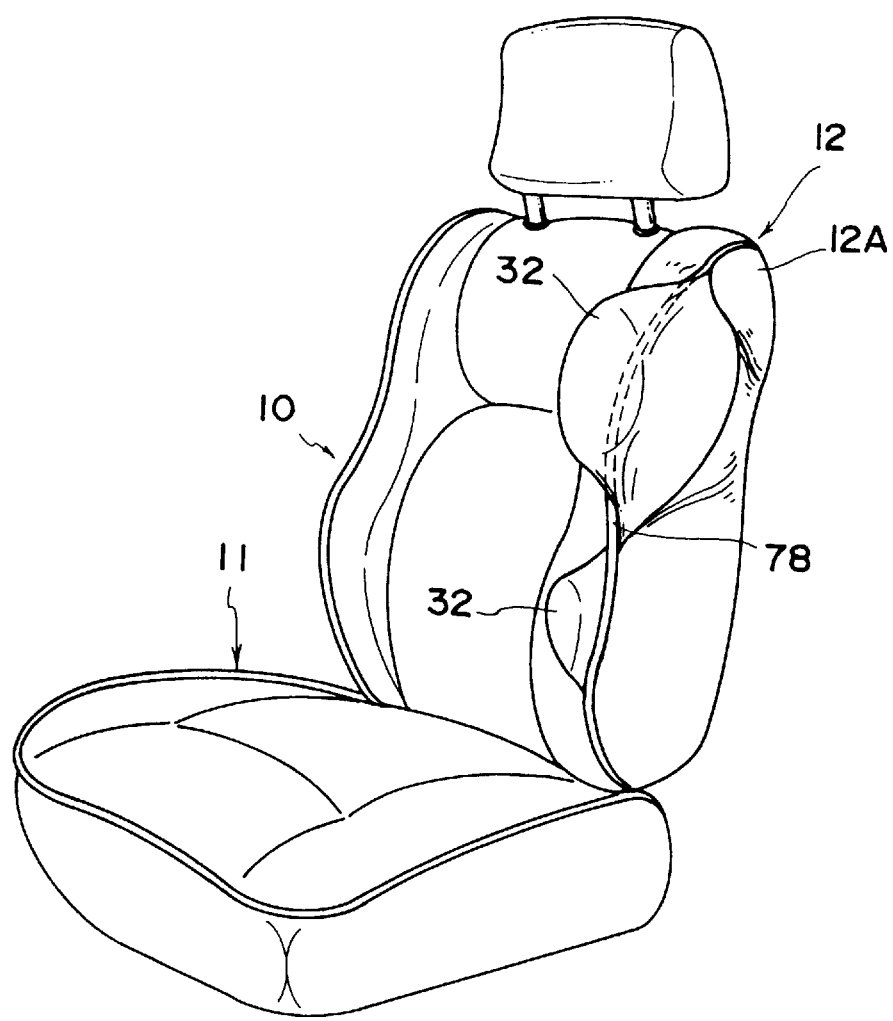
FIG. 16 is a perspective view depicting the state in which an air bag is inflated so as to extend over a welt.
Figure 17:
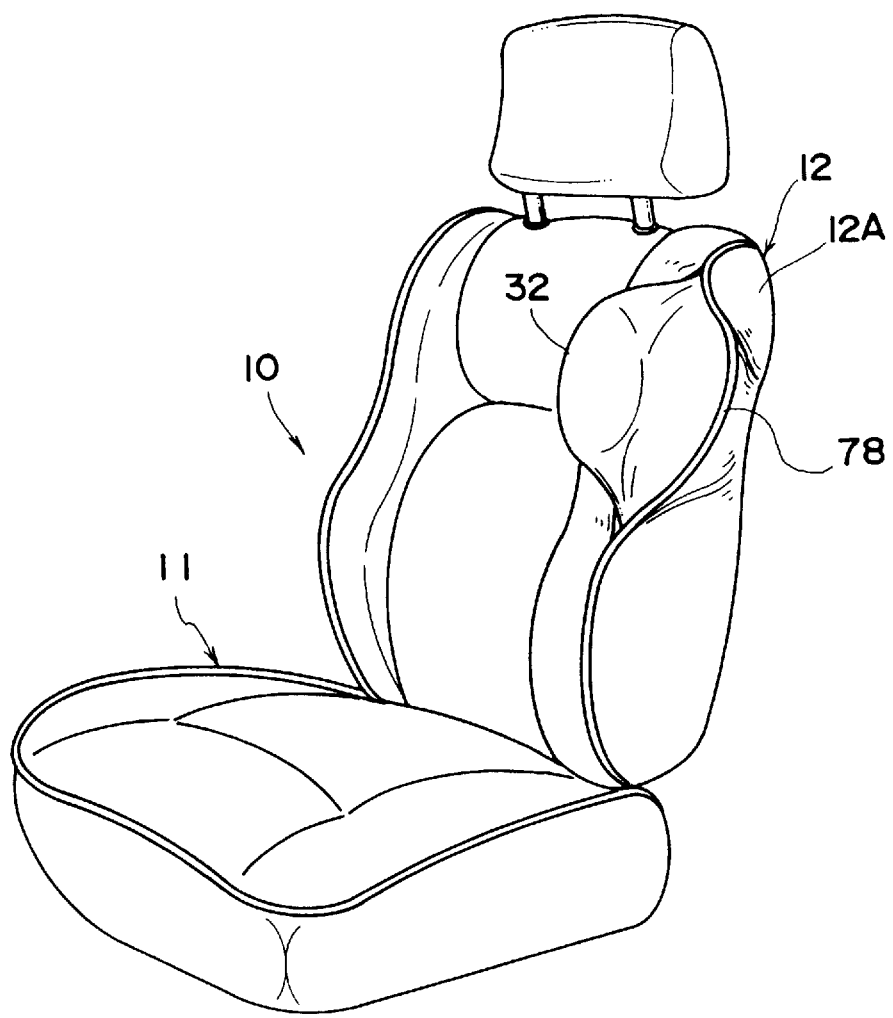
FIG. 17 is a perspective view showing the state in which the air bag is inflated toward the front of a seat with respect to the welt.

Thus, the air bag 32 is prevented from being inflated across the welt 78 as shown in FIG. 16. As shown in FIG. 17, the air bag 32 is inflated toward the front of the seat with respect to the welt 78. Therefore, the welt 78 does not interfere with the inflation of the air bag 32.

2. In a case in which the front side surface layer 44 is broken at the sewn portion 48:

The welt 78 is sewn to the seat back side surface layer 46 by the first sewing thread 84 even at the portion (corresponding to the portion of the range L shown in FIG. 14) and the portions above and below this portion. Therefore, in this case, the welt 78 is brought into a state of being fixed to only the seat back side surface layer 46.

Thus, since the air bag 32 is inflated toward the front of the welt 78 as shown in FIG. 17, the welt 78 does not interfere with the inflation of the air bag 32.

3. In a case in which the seat back side surface layer 46 is broken at the sewn portion 48:

The cotton cloth 50 is sewn to the front side surface layer 44 by the first sewing thread 84 at the portion (corresponding to the portion of the range L shown in FIG. 14) at which the cotton cloth 50 is sewn. Therefore, the air bag 32 cannot be inflated. However, since the cotton cloth 50 which is hard to break and the welt 78 are sewn together relatively strongly at this portion by the second sewing thread 86, the front side seat surface layer 44 inevitably breaks next. Therefore, the welt 78 is brought into a state of being fixed to only the seat back side surface layer 46.

Thus, since the air bag 32 is inflated toward the front of the welt 78 as shown in FIG. 17, the welt 78 does not interfere with the inflation of the air bag 32.

On the other hand, in this case, the hard-to-break cotton cloth 50 and the welt 78 are not firmly sewn together at the portions above and below the portion of the cotton cloth 50 sewn by the second sewing thread 86 as shown in FIG. 15, as compared with the sewing shown in FIG. 13A. As a result, the front side seat surface layer 44 inevitably breaks next, so that there is the possibility that the welt 78 will be unable to be controlled so to be fixed to only the seat back side surface layer 46. However, in the third embodiment, the cotton cloth 50 is disposed within the range of the vertically-extending width M of the air bag 32, and the vertically-extending width L of the front terminal portion 50A of the cotton cloth 50 is set to be greater than or equal to one-half of the vertically-extending width M of the air bag 32, preferably, M>L≧0.6M. As a result, uncontrollable regions of the seat back side surface layer 44, i.e., the regions (corresponding to ranges N shown in FIG. 14) become small and the welt 78 is brought into a state of being fixed to only the seat back side surface layer 46 in accordance with the way in which the portion at which the cotton cloth 50 is sewn breaks.

Thus, since the air bag 32 is inflated toward the front of the welt 78 as shown in FIG. 17, the welt 78 does not interfere with the inflation of the air bag 32.

In the seat structure according to the third embodiment as described above, the sewn portion 48 can be instantaneously broken without being hindered by the welt 78 so as to rapidly inflate the air bag 32, even in the case of a seat in which the welt 78 is disposed at the sewn portion 48 at which the front terminal portion 46A of the seat back side surface layer 46 and the outer terminal portion 44A of the front side seat surface layer 44 are sewn together. Therefore, the material for the seat back side surface layer 46 is not limited to a hard-to-stretch material.

Figure 18:
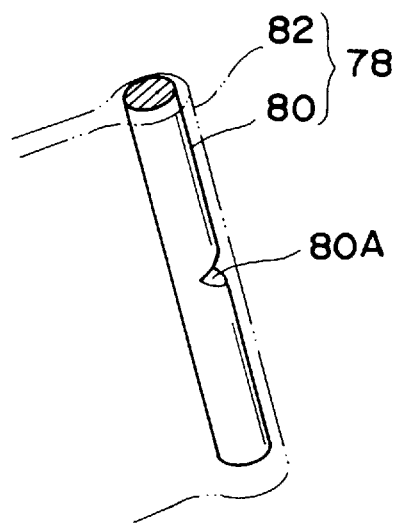
FIG. 18 is a perspective view illustrating a welt employed in an air bag apparatus according to a modification of the third embodiment of the present invention.

As shown in FIG. 18, at least one cut 80A or the like serving as a weak portion may be defined in the welt cord 80. In this case, when the air bag 32 is inflated past the welt 78 as shown in FIG. 16, the welt 78 may be broken at the cut 80A so that the air bag 32 is inflated to the intended expanded configuration.

Figure 19:
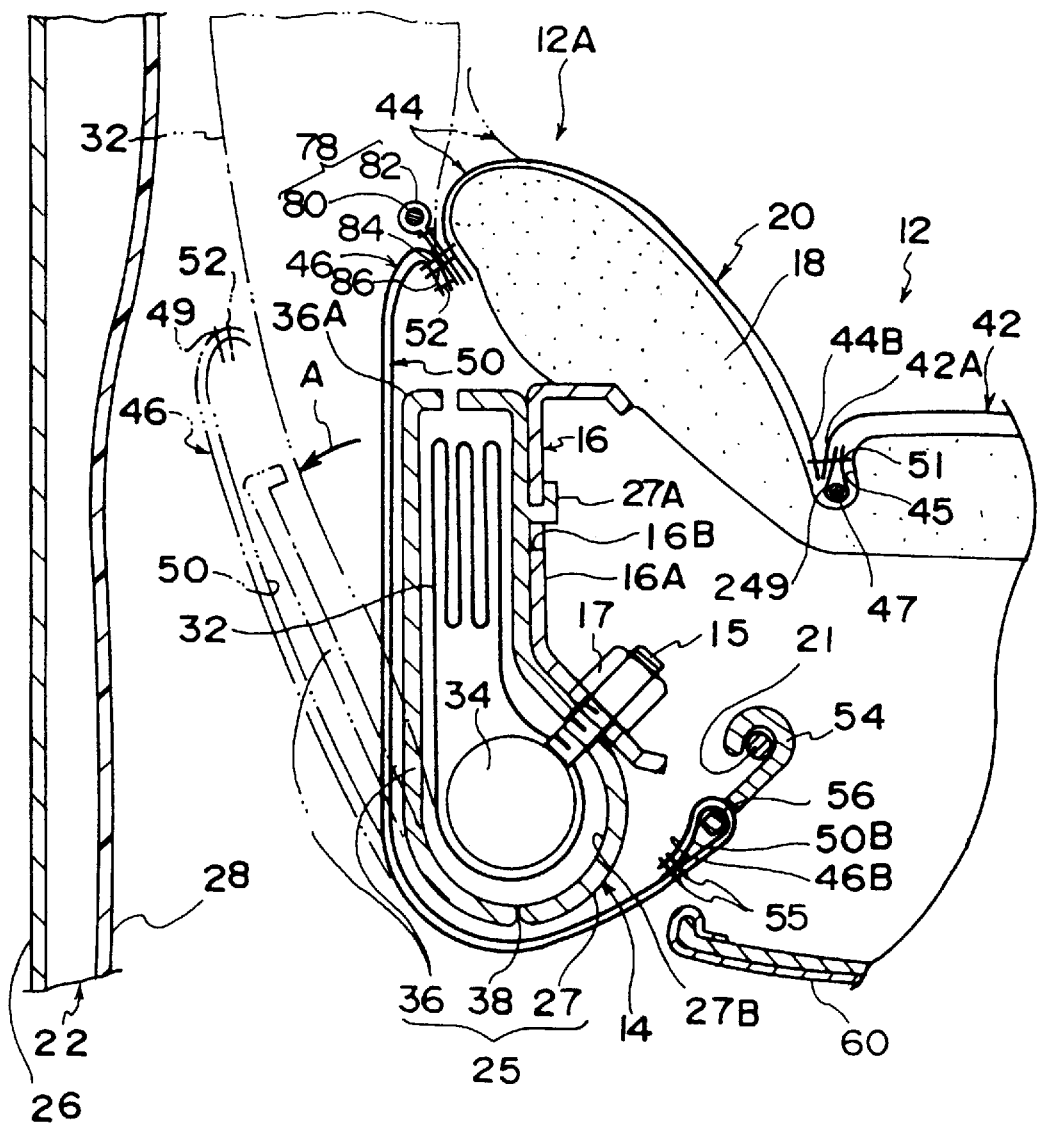
FIG. 19 is a horizontal cross-sectional view showing a side portion of the seat structure shown in FIG. 7.

Although not described in further detail, the welt 78 can bring about the aforementioned function and effects even if the welt 78 is employed in the invention of the first embodiment as shown in FIG. 19.

A fourth embodiment of the present invention, which is a seat structure having a side impact air bag apparatus, will now be described with reference to FIGS. 20 and 21.

In the seat structure according to the fourth embodiment, a box-shaped air bag apparatus 14, which extends in the vertical direction of the vehicle, is disposed within a side portion 12A of a seat back 12 of a seat 10, which side portion 12A is the vehicle transverse direction outer side portion of the seat back 12 in a manner similar to the first embodiment as shown in FIG. 4.

Figure 20:
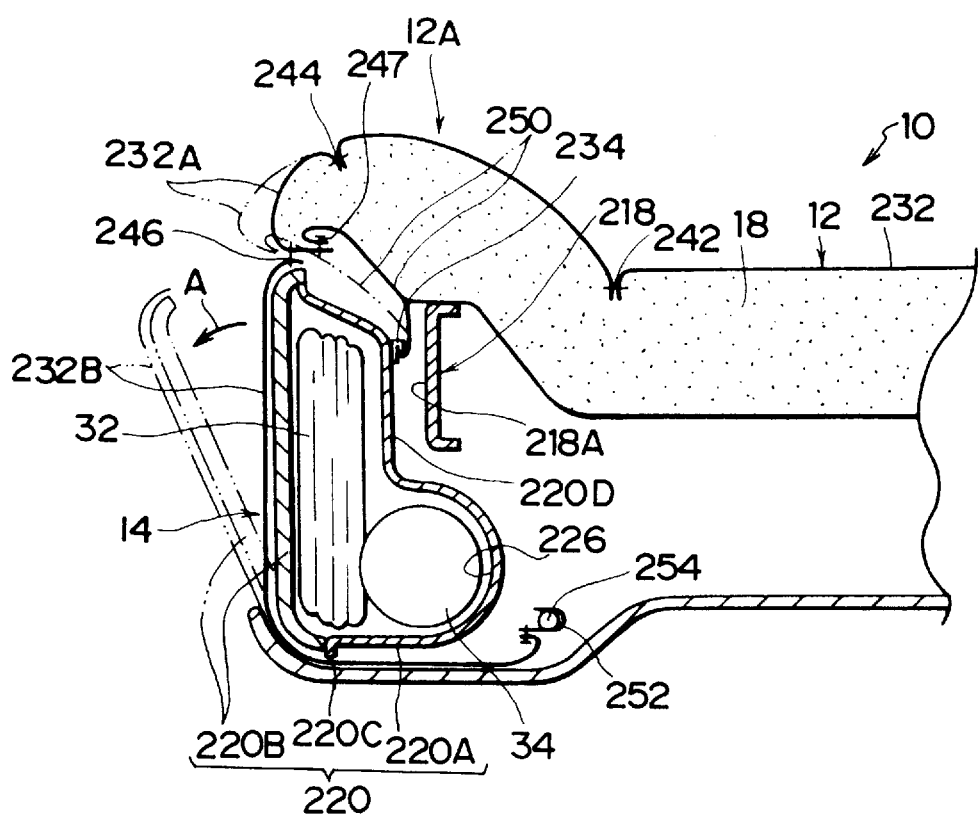
FIG. 20 is a horizontal cross-sectional view depicting a side portion of a seat structure provided with a side impact air bag apparatus, according to a fourth embodiment of the present invention.
Figure 21:
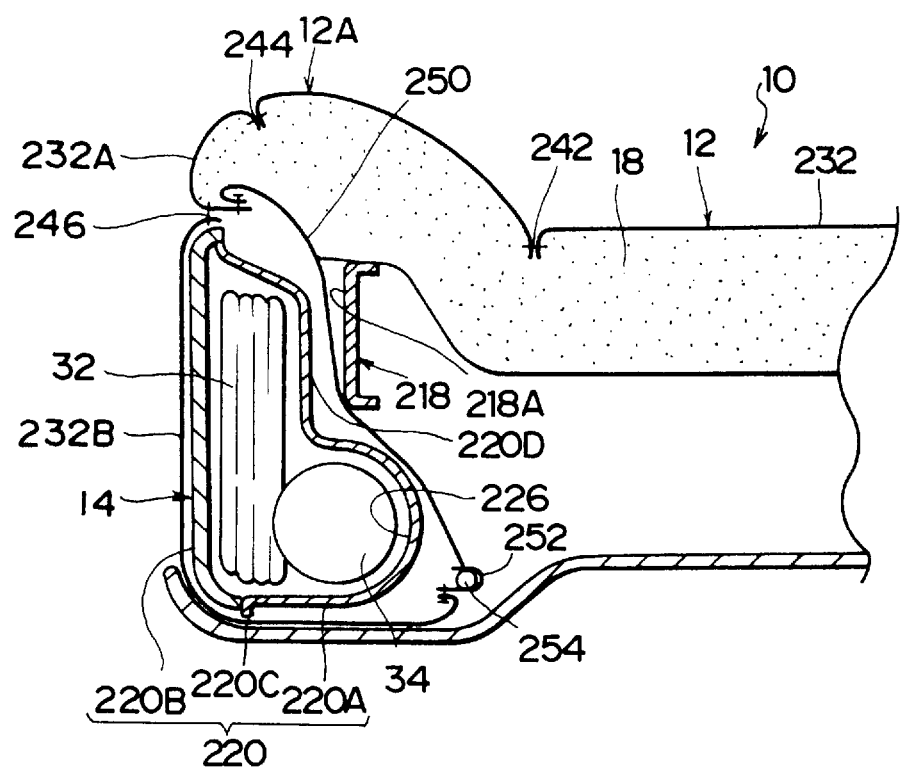
FIG. 21 is a horizontal cross-sectional view illustrating a side portion of a seat structure provided with a side impact air bag apparatus, according to a modification of the fourth embodiment of the present invention.

As illustrated in FIG. 20, a side frame 218 that forms a seat back frame, is disposed within the side portion 12A of the seat back 12. A base 220A of an air bag case 220 is attached to a seat transverse direction outer surface 218A of the side frame 218 by unillustrated fixing members such as bolts, nuts, or the like. A folded air bag 32 is accommodated within the base 220A of the air bag case 220. Further, an inflator storage portion 226 is provided at a bottom portion 220D of the base 220A so as to protrude toward the vehicle transverse direction inner side of the seat 10. A cylindrical inflator 34 is stored within the inflator storage portion 226.

Further, a portion of the air bag case 220 at the opposite side of the side frame 218 with respect to the base 220A is a cover 220B. When the air bag 32 is inflated by the flow of gas injected from the inflator 34, the cover 220B opens outwardly (i.e., in the direction indicated by arrow A in FIG. 20) about a hinge 220C formed at a vehicle longitudinal direction rear end of the seat 10.

A seat surface layer 232 covers the outside of a seat pad 18 which covers the side of the seat back frame which the vehicle occupant contacts. The seat surface layer 232 is formed by sewing several seat surface layers together at stitches 242, 244, 246, and the like. When the air bag 32 is inflated, the stitches 246 opposed to a front edge portion of the cover 220B of the air bag case 220 break. The stitch 246 is a sewn portion formed by sewing a side seat surface layer 232A, which is located at the outer side of the side portion 12A of the seat back 12, to a seat surface layer 232B for covering the cover 220B.

With the stitches 246 as a reference, the side seat surface layer 232A, which is located at the outer side of the side portion 12A of the seat back 12, and the bottom portion 220D of the air bag case 220, which is used as a seat-side fixing material, are connected together by a fabric of force 250, which is used as a tensile force transfer member and hardly stretches. The fabric of force 250 is fixed to the side seat surface layer 232A by sewing, for example, by the stitch 247. The bottom portion 220D of the air bag case 220 is brought into engagement with the other end of the fabric of force 250 through a hook 234 welded in the vicinity of the front end of the bottom portion 220D.

Further, a hook 252 is fixed to an end of the seat surface layer 232B for covering the cover 220B, which end is located at the rear side of the seat 10. The hook 252 is brought into engagement with a seat wire 254.

The operation of the fourth embodiment will now be described.

In the seat structure according to the fourth embodiment, when an inflator 34 of the air bag apparatus 14 is activated at the time of a side impact, the air bag 32 is inflated by the flow of gas injected from the inflator 34 so as to push and open the cover 220B of the air bag case 220 in the direction indicated by arrow A in FIG. 20.

The side seat surface layer 232A located outside the side portion 12A of the seat back 12 and the bottom portion 220D of the air bag case 220 are joined together by the fabric of force 250 with the stitch 246 as the reference. Therefore, at this time, the side seat surface layer 232A is restrained by the fabric of force 250. As a result, the side seat surface layer 232A is hardly displaced as indicated by an imaginary line in FIG. 20.

Accordingly, the load that pushes and opens the cover 220B of the air bag case 220 due to the inflation of the air bag 32 is concentrated at the stitch 246. Therefore, the stitch 246 can be instantaneously broken. As a result, in accordance with the present invention, the air bag can be rapidly expanded with a simple structure and without the need for the measures required by the conventional art such as weakening the force between the stitches by appropriately selecting the seat surface layer material, the sewing thread, the sewing structure or the like, or making the structure complex in order to improve the performance of the inflator.

Figure 22:
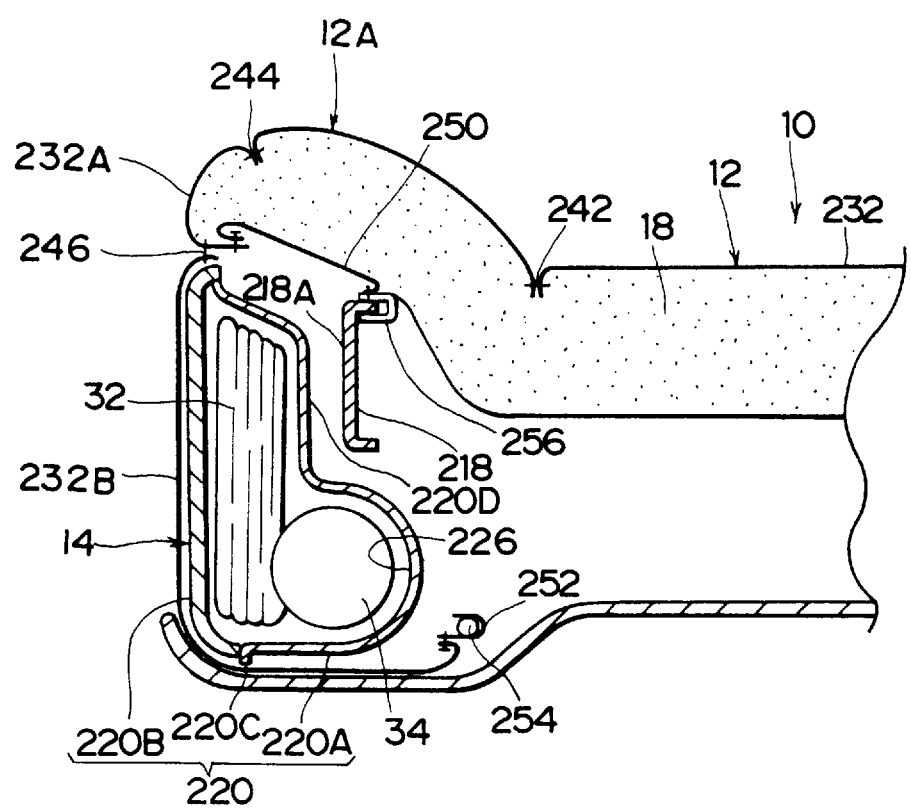
FIG. 22 is a horizontal cross-sectional view showing a side portion of a seat structure provided with a side impact air bag apparatus, according to another modification of the fourth embodiment of the present invention.

In the seat structure according to the fourth embodiment, the side seat surface layer 232A located at the outer side of the side portion 12A of the seat back 12 and the bottom portion 220D of the air bag case 220 are connected together by the fabric of force 250 as shown in FIG. 20. However, the seat-side fixing member for connecting the fabric of force 250 is not limited to the bottom portion 220D of the air bag case 220 and may be another portion. As shown in FIG. 21 by way of example, the fabric of force 250 may be connected to the seat wire 254 used as the seat-side fixing member via the hook 252. Further, as illustrated in FIG. 22, the fabric of force 250 may be coupled to the side frame 218 used as the seat-side fixing member via a hook 256.

A fifth embodiment of the present invention, which is a seat structure having a side impact air bag apparatus, will now be described with reference to FIG. 23.

The same elements of structure as those employed in the fourth embodiment are identified by the same reference numerals and their description will be omitted.

Figure 23:
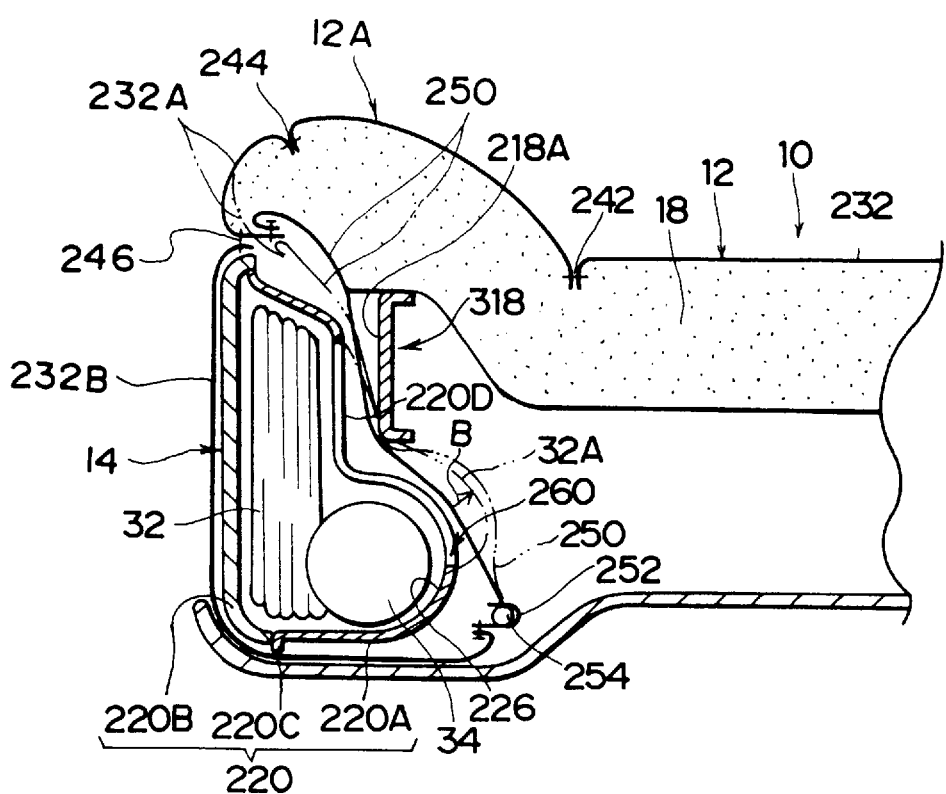
FIG. 23 is a horizontal cross-sectional view depicting a side portion of a seat structure provided with a side impact air bag apparatus, according to a fifth embodiment of the present invention.
Figure 24:
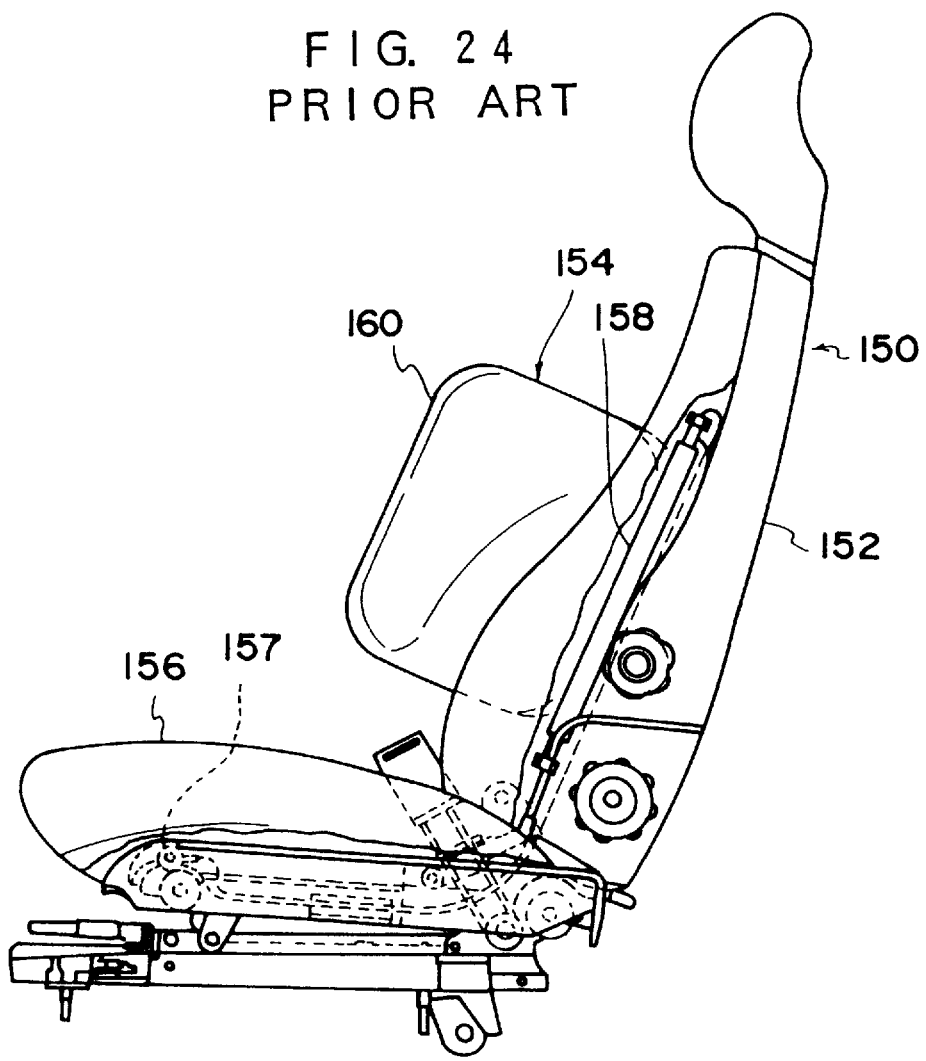
FIG. 24 is a schematic side view showing a seat structure provided with a side impact air bag apparatus, according to a conventional embodiment.
Figure 25:
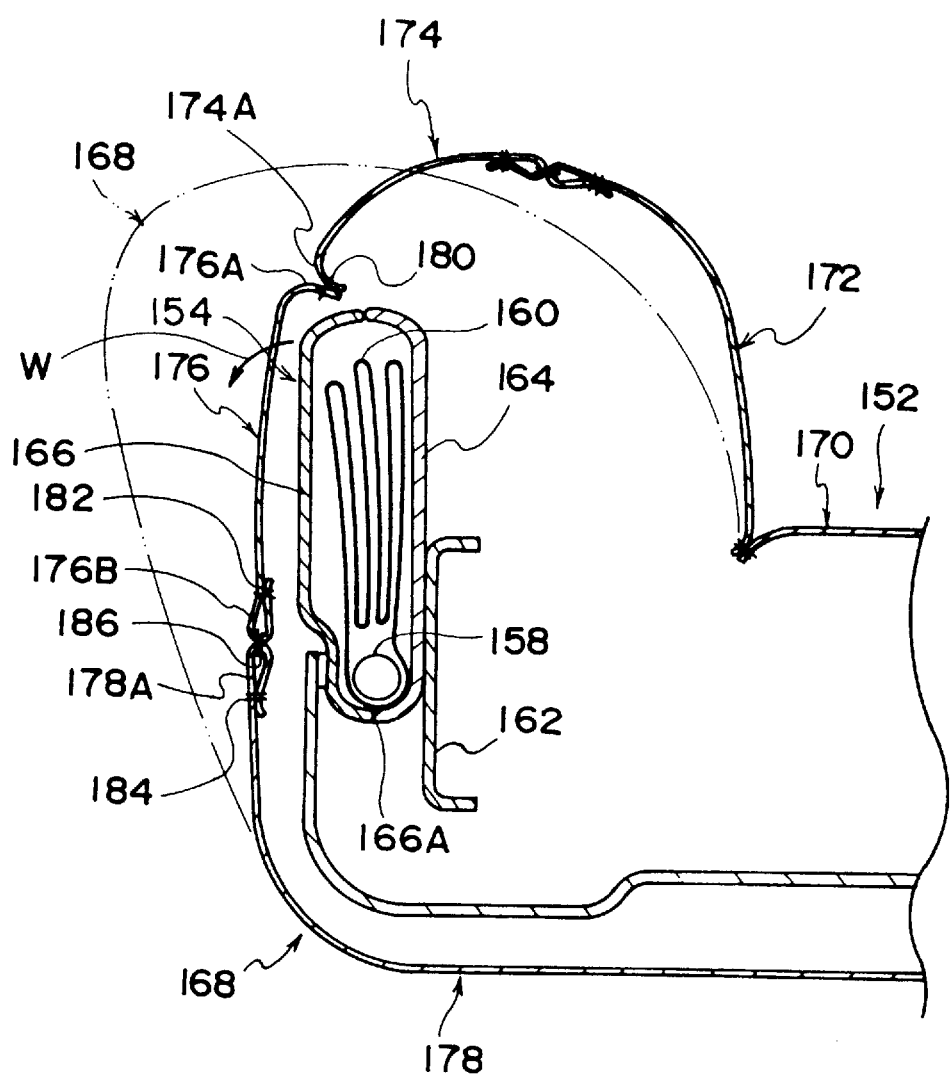
FIG. 25 is a horizontal cross-sectional view illustrating a side portion of the seat structure shown in FIG. 24.
Figure 26:
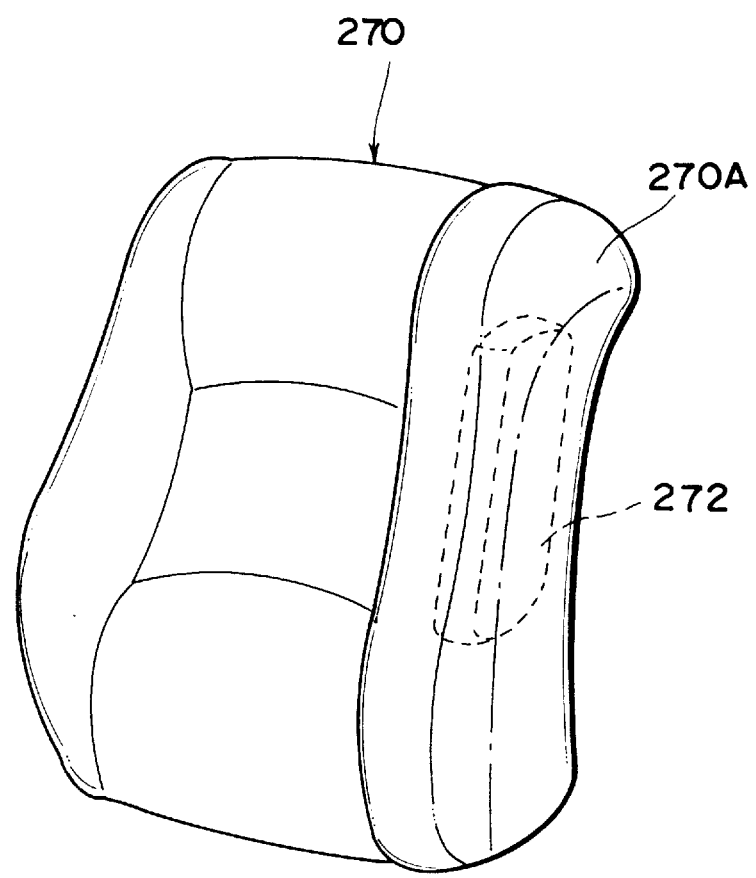
FIG. 26 is a perspective view as seen diagonally from the front, showing a seat back of a seat structure provided with a side impact air bag apparatus, according to another conventional embodiment.
Figure 27:
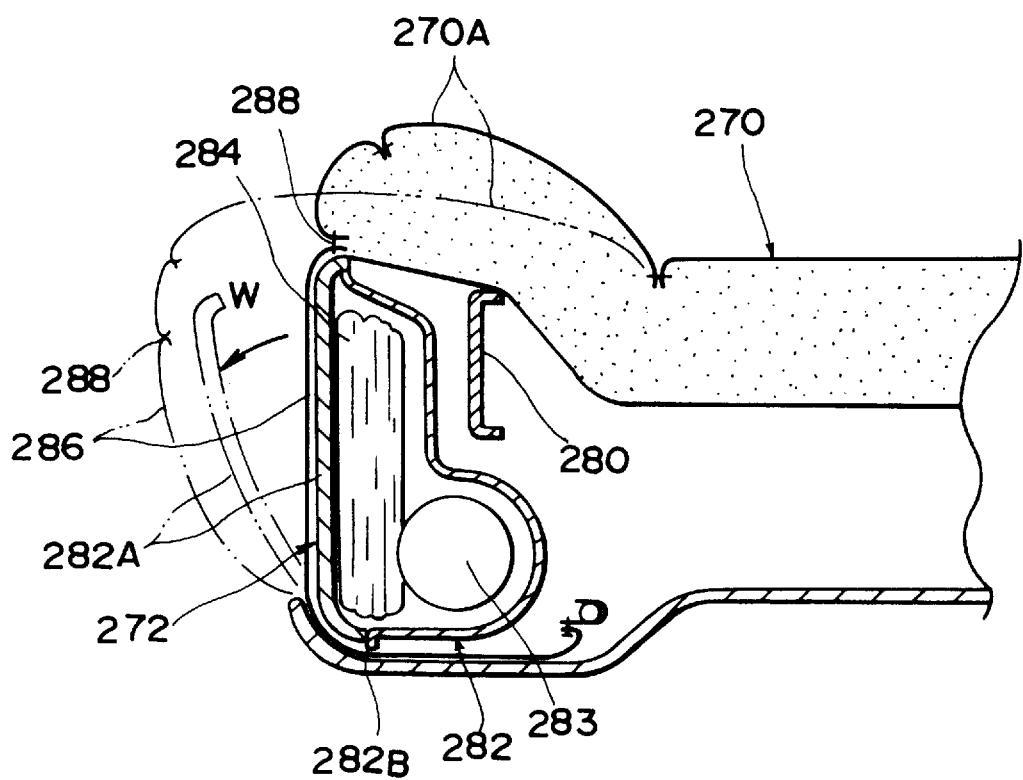
FIG. 27 is a horizontal cross-sectional view illustrating a side portion of the seat structure shown in FIG. 26.

In the seat structure according to the fifth embodiment, a fabric of force 250 is coupled to a seat wire 254 via a hook 252 interposed therebetween as shown in FIG. 23. Further, the fabric of force 250 is disposed along a bottom portion 220D of an air bag case 220.

An aperture 260 is defined in a portion of the bottom portion 220D of the air bag case 220, which portion is opposed to the fabric of force 250. When the air bag 32 is inflated as indicated by an imaginary line in FIG. 23, a portion 32A of the air bag 32 extends out through the aperture 260.

The operation of the fifth embodiment will now be described.

In the seat structure according to the fifth embodiment, when an inflator 34 of the air bag apparatus 14 is activated, the air bag 32 is inflated by the flow of gas injected from the inflator 34 so as to push and open a cover 220B of the air bag case 220.

At this time, a side seat surface layer 232A located at the outer side of the side portion 12A of the seat back 12 is coupled to the seat wire 254 by the fabric of force 250 with a stitch 246 as the reference. Further, since the aperture 260 is defined in the portion of the bottom portion 220D of the air bag case 220, which portion is opposed to the fabric of force 250, the portion 32A of the air bag 32 extends out through the aperture 260 as indicated by the imaginary line in FIG. 23 to thereby press the fabric of force 250 inwardly in the transverse direction of the seat 10 (i.e., in the direction indicated by arrow B in FIG. 23).

Thus, since the side seat surface layer 232A is pulled toward the inner side of the seat 10 as indicated by the imaginary line in FIG. 23, the stitch 246 can be broken more quickly than in the fourth embodiment. As a result, the air bag can be inflated more quickly.

The present invention has been described above in detail by the specific embodiments. However, the present invention is not necessarily limited to or by such embodiments. It will be apparent to those skilled in the art that other various forms might be adopted within the scope of the present invention as set forth herein. For example, the tensile force transfer member is not limited to the fabric of force 250, and any other member may be used provided that it is a member which is able to reliably transfer tensile force.

What is claimed is:

1. A seat structure having a side impact air bag apparatus, said seat structure having a seat cushion and a seat back, the seat back having a front and a side opposing a vehicle door, said seat structure being constructed such that said air bag apparatus, which is integrated into a side portion of the seat back, which side portion opposes the vehicle door, is activated at the time of a side impact such that a sewn portion of a seat surface layer, which is formed by sewing a front seat surface layer for covering the front of the seat back to a side seat surface layer for covering the side of the seat back, breaks and an air bag body inflates between a side portion of a vehicle body and the side of a vehicle occupant most proximate said vehicle door, comprising:

a sheet member provided inside said side seat surface layer integrally with said side seat surface layer, said sheet member being harder to stretch than said side sat surface layer, and one end of said sheet member being sewn to said sewn portion; and a fixing member provided in side the seat back, said fixing member being connected to another end of said sheet member which is provided on the opposite side of said one end of said sheet member.

2. A seat structure according to claim 1, wherein said one end of said sheet member is tacked to said side seat surface layer and is, together with said side seat surface layer, sewn to said front seat surface layer by sewing thread at a position located at a vehicle transverse direction outer side of the position where said one end of said sheet member is tacked to said side seat surface layer.

3. A seat structure according to claim 1, further comprising:
an engaging member which, together with said side seat surface layer, is attached to said another end of said sheet member.

4. A seat structure according to claim 3, wherein said engaging member engages said fixing member.

5. A seat structure according to claim 4, wherein said fixing member is a wire fixed to a frame of the seat back.

6. A seat structure according to claim 1, wherein said sheet member is shaped in the form of a strap having a width narrower than a vertically-extending width of the air bag body, and is disposed at a position including a vertically-extending central portion of the air bag body.

7. A seat structure according to claim 1, further comprising:
a welt provided at said sewn portion sewn to said front seat surface layer, said side seat surface layer and said sheet member, and composed of a welt fabric and a welt cord, said welt remaining on said side seat surface layer side in a region in which said welt is sewn to at least said sheet member when the air bag body inflates.

8. A seat structure according to claim 7, wherein said welt fabric is sewn by second sewing thread for sewing the side seat surface layer and said sheet member together, said second sewing thread being located further toward an inner side of a seat than the position of a first sewing thread for sewing said front seat surface layer, said side seat surface layer and said sheet member together.

9. A seat structure according to claim 8, wherein said second sewing thread has at least one of a higher strength that a strength of said first sewing thread and a smaller sewing pitch than a sewing pitch of said first sewing thread.

10. A seat structure according to claim 7, wherein said sheet member is provided within a range of the vertically-extending width of the air bag body, and is provided so as to have a width greater than or equal to one-half of the vertically-extending width of the air bag body.

11. A seat structure according to claim 7, wherein said welt cord has at least one weak portion which is provided within a range of the vertically-extending width of the air bag body and breaks when the air bag body expands.

12. A seat structure according to claim 1, wherein said sheet member is made of cloth.

13. A seat structure according to claim 1, wherein said sheet member is fit closely to an inner surface of said side seat surface layer.

14. A seat structure according to claim 1, wherein said sheet member is positioned at a passage through which gas discharged from an inflator reaches said sewn portion.

15. A seat structure having a side impact air bag apparatus, said seat structure having a seat cushion and a seat back, the seat back having a front and a side opposing a vehicle door, said seat structure being constructed such that said air bag apparatus, which is integrated into a side portion of the seat back, which side portion opposes the vehicle door, is activated at the time of a side impact such that a sewn portion of a seat surface layer, which is formed by sewing a front seat surface layer for covering the front of the seat back to a side seat surface layer for covering the side of the seat back, breaks and an air bag body inflates between a side portion of a vehicle body and the side of a vehicle occupant most proximate said vehicle door, comprising:
a sheet member provided inside said side seat surface layer and provided such that a front end of said sheet member located at a vehicle longitudinal direction front side of the seat back is fixed to said side seat surface layer, said sheet member being harder to stretch than said side seat surface layer; and
a fixing member provided inside the seat back, said fixing member being connected to a vehicle longitudinal direction rear end of said sheet member located at a vehicle longitudinal direction rear side of the seat back.

16. A seat structure according to claim 15, wherein said front end of said sheet member is tacked to said side seat surface layer and is, together with said side seat surface layer, sewn to said front seat surface layer by sewing thread at a position located at a vehicle transverse direction outer side of the position where said front end of said sheet member is tacked to said side seat surface layer.

17. A seat structure according to claim 16, further comprising:
an engaging member attached to the rear end of said sheet member, said rear end of said sheet member connected to said fixing member through said engaging member.

18. A seat structure according to claim 15, wherein said sheet member is shaped in the form of a strap having a width narrower than a vertically-extending width of the air bag body, and is disposed at a position including a vertically-extending central portion of the air bag body.

19. A seat structure according to claim 15, further comprising:
a welt provided at the sewn portion sewn to said front seat surface layer, said side seat surface layer and said sheet member, and composed of a welt fabric and a welt cord, said welt remaining on said side seat surface layer side in a region in which said welt is sewn to at least said sheet member when the air bag body inflates.

20. A seat structure according to claim 19, wherein said welt fabric is sewn by second sewing thread for sewing said side seat surface layer and said sheet member together, said second sewing thread being located further toward an inner side of a seat than the position of a first sewing thread for sewing said front seat surface layer, said side seat surface layer and said sheet member together.

21. A seat structure according to claim 20, wherein said second sewing thread has at least one of a higher strength than a strength of said first sewing thread and a smaller sewing pitch than a sewing pitch of said first sewing thread.

22. A seat structure according to claim 19, wherein said sheet member is provided within a range of the vertically-extending width of the air bag body, and is provided so as to have a width greater than or equal to one-half of the vertically-extending width of the air bag body.

23. A seat structure according to claim 19, wherein said welt cord has at least one weak portion which is provided within a range of the vertically-extending width of the air bag body and breaks when the air bag body expands.

24. A seat structure according to claim 15, wherein said sheet member is made of cloth.

25. A seat structure according to claim 15, wherein said sheet member is fit closely to an inner surface of said side seat surface layer.

26. A seat structure having a side impact air bag apparatus, said seat structure having a seat cushion and a seat back, the seat back having a front and a side opposing a vehicle door, said seat structure being constructed such that said air bag apparatus, which is integrated into a side portion of the seat back, which side portion opposes the vehicle door, is activated at the time of a side impact such that a sewn portion provided at a seat surface layer breaks and an air bag body expands between a side portion of a vehicle body and the side of a vehicle occupant most proximate said vehicle door, comprising:

a tensile force transfer member for connecting a side seat surface layer, which covers the side of the seat back, and a fixing member, which is provided inside the seat back, to each other.

27. A seat structure according to claim 26, wherein said tensile force transfer member is provided at the vehicle transverse direction inner side of an air bag case so as to extend along an external periphery of the air bag case provided at said air bag apparatus.

28. A seat structure according to claim 27, wherein said air bag case has an aperture defined in a portion thereof opposed to said tensile force transfer member.

29. A seat structure according to claim 26, further comprising:

an engaging member attached to a longitudinal direction end portion of said tensile force transfer member, said tensile force transfer member being connected to said fixing member via said engaging member.

30. A seat structure according to claim 29, wherein:

said tensile force transfer member is provided at the vehicle transverse direction inner side of an air bag case so as to extend along the external periphery of the air bag case provided at said air bag apparatus; and said fixing member is mounted to said air bag case.

31. A seat structure according to claim 29, wherein said fixing member is mounted to a side frame which is a portion of the seat back.

32. A seat structure according to claim 29, wherein said fixing member is provided at a seat wire which is a portion of the seat back.

33. A seat structure according to claim 26, wherein said tensile force transfer member is made of cloth.

34. A seat structure according to claim 26, wherein said sewn portion is sewn to a portion of said side seat surface layer positioned further toward a front of the vehicle body than a sewn-together portion of a portion of said side seat surface layer, which portion is positioned at an outer side of the side portion of the seat back, and a portion of said seat surface layer, which portion covers a cover of said air bag apparatus.

35. A seat structure according to claim 26, wherein said tensile force transfer member is fixed to a frame which is a fixed member provided at an inner portion of the seat back.

\* \* \* \* \*